United States Patent
Infosino

(10) Patent No.: US 7,006,832 B1
(45) Date of Patent: Feb. 28, 2006

(54) METHOD FOR INTELLIGENT HOME CONTROLLER AND HOME MONITOR

(75) Inventor: William J. Infosino, Watchung, NJ (US)

(73) Assignee: AT&T Corp., New York, NY (US)

( * ) Notice: Subject to any disclaimer, the term of this patent is extended or adjusted under 35 U.S.C. 154(b) by 680 days.

(21) Appl. No.: 09/801,417

(22) Filed: Mar. 7, 2001

(51) Int. Cl.
*H04Q 7/20* (2006.01)

(52) U.S. Cl. ............................... 455/456.1; 455/456.3; 455/414.1; 455/417; 455/411; 279/200; 279/201.1; 340/506; 340/539.11

(58) Field of Classification Search ................ 455/565, 455/414.1, 415, 416, 417, 410, 411, 412.1, 455/421, 456.1, 456.3; 379/200, 201.6, 37, 379/42; 340/539.11, 506
See application file for complete search history.

(56) References Cited

U.S. PATENT DOCUMENTS

| | | | | |
|---|---|---|---|---|
| 5,428,663 A | | 6/1995 | Grimes et al. | |
| 5,822,418 A | * | 10/1998 | Yacenda et al. | ....... 379/201.07 |
| 6,134,310 A | * | 10/2000 | Swan et al. | .................. 379/188 |
| 6,236,319 B1 | * | 5/2001 | Pitzer et al. | ............. 370/573.4 |
| 6,246,756 B1 | * | 6/2001 | Borland et al. | ........ 379/142.01 |
| 6,370,233 B1 | * | 4/2002 | Bennett et al. | ............... 379/37 |
| 6,539,393 B1 | * | 3/2003 | Kabala | ....................... 707/102 |
| 2001/0050976 A1 | * | 12/2001 | Simon et al. | .................. 379/39 |
| 2002/0035404 A1 | * | 3/2002 | Ficco et al. | .................... 700/65 |

* cited by examiner

*Primary Examiner*—Charles N. Appiah
*Assistant Examiner*—Khawar Iqbal

(57) ABSTRACT

A method utilizing a transmitter emitting a unique signal and a base station receiver having a database of household members is used to ascertain the identity of household members who are home at any particular time. Such information is used by the local telephone network to provide specialized telephone services to the household based on the identity of the household members who are home. A manual and emergency services override is provided to permit the completion of telephone calls from emergency services personnel and other persons irrespective of the presence or absence of any household member. The information regarding the presence or absence of household members also may be used to intelligently provide other household services such as heating and cooling or home security depending on the identity of persons who are home.

4 Claims, 19 Drawing Sheets

101
104

102

101, 102

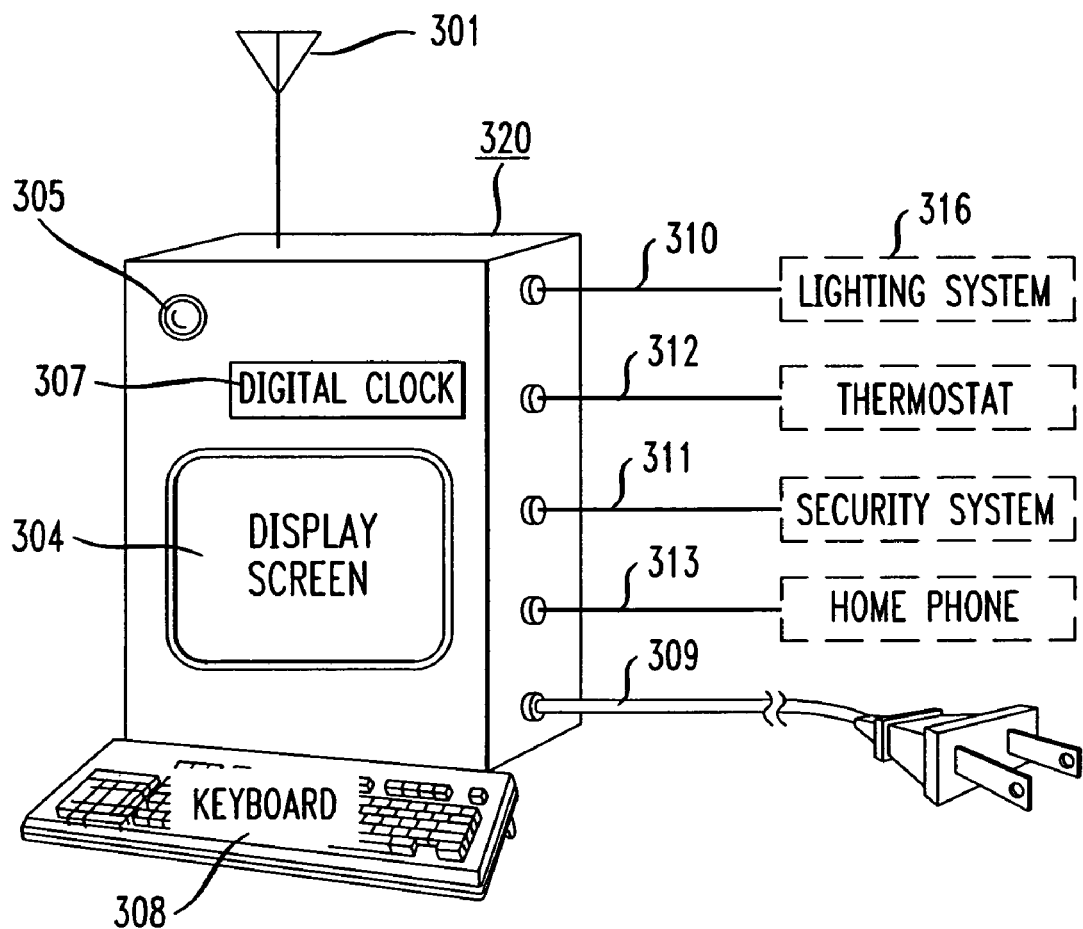

300

410

420

430

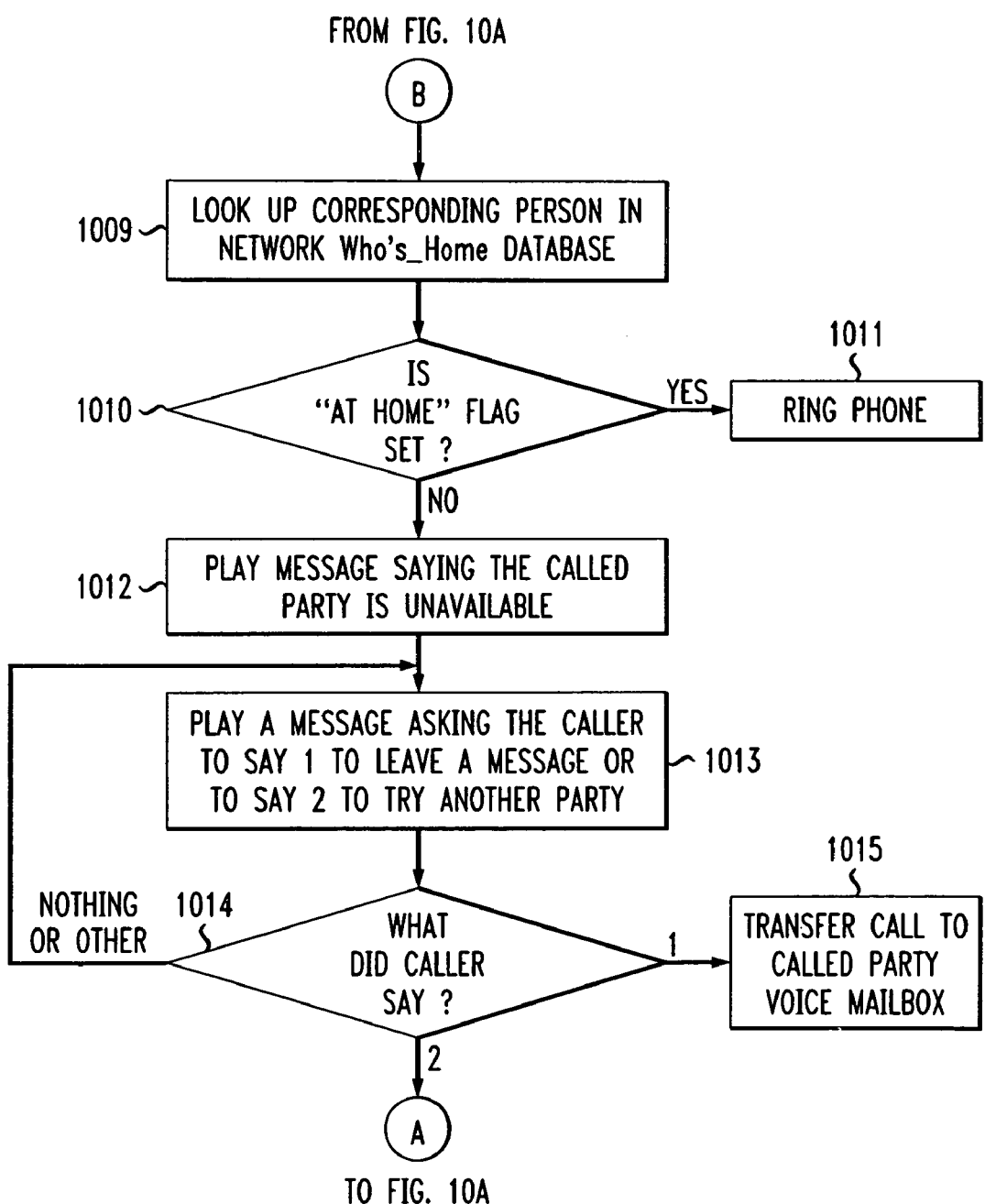

FIG. 12A
1201

- 1211 — SUBSCRIBER TELEPHONE NUMBER
- 1221 — RESTRICTED OUTBOUND TELEPHONE NUMBERS
- 1231 — TRANSMITTER ID NO. 1
- ⋮
- 1241 — TRANSMITTER ID NO. N

FIG. 12B
1202

- 1212 — SUBSCRIBER TELEPHONE NUMBER
- 1222 — RESTRICTED INBOUND TELEPHONE NUMBERS
- 1232 — TRANSMITTER ID NO. 1
- ⋮
- 1242 — TRANSMITTER ID NO. N

METHOD FOR INTELLIGENT HOME CONTROLLER AND HOME MONITOR

This application is related by subject matter to U.S. patent application Ser. No. 09/801,418, filed Mar. 7, 2001, entitled "System For Intelligent Home Controller and Home Monitor" and U.S. patent application Ser. No. 09/801,391, filed Mar. 7, 2001, entitled "Home Resource Controller System, by the inventor of the present application filed concurrently herewith.

FIELD OF THE INVENTION

The present invention relates to a system encompassing a transmitting and a receiving device that correlates a specific transmission to a particular person at a particular location and so permits the identity of persons present in a location to be determined. Identification of the persons who are present at a particular location at any given time enables, for example, the provision of customized telephone services based on the identity of the persons present, and further permits the provision of other customized services within that location based on the identity of the persons present.

BACKGROUND OF THE INVENTION

The telephone is a necessity of modern life. But, because it is a shared resource, it can be the source of family conflict in some households. For example, one person may become annoyed if they too frequently have to answer a ringing phone and take messages for someone who is not home. In addition, answering call waiting signals for someone who is not at home can annoy both the person answering the call and the person they put "on hold" to answer the call waiting signals. Furthermore, the person who is not home can become angry if someone forgets to tell them about an important call that was received by someone else while they were away. The telephone bill can be another potential source of family conflict. Teenagers may talk longer on toll calls than their parents would prefer, or may access "900" or other numbers in contravention of parental rules. Consequently, it is desirable to develop technology to provide "intelligent" telephone services that can vary depending on whether a particular person is home or on the identity of the person using the telephone.

In addition, it may be desirable to provide a means for "intelligently" controlling certain other shared resources in the home, such as the thermostat or a home security system, depending on whether someone is at home.

One way in which this can be accomplished is to provide each household member with a transmitter that communicates to a base station in the home, providing an indication that the person having the transmitter is home. The base station can then upload that information to the telephone network so that the telephone network can tailor its services accordingly.

Previous technology that communicates to a telephone network has been available. One such system is the AT&T Enhanced Personal Base Station (EPBS). The EPBS is part of AT&T's Fixed Wireless Service. When a customer's wireless telephone is within range of the EPBS (i.e., inside the home or business), the wireless telephone operates as though it were a cordless telephone operating on a wireline network. In other words, the wireless telephone provider will operate the wireless telephone differently depending on whether it is within range of a base station receiver in the home or office.

However, the EPBS system is limited to use with a wireless telephone, and people do not always take the wireless phones with them when they leave home, or they may lend their wireless phone to other members of the household. Consequently, the EPBS does not adequately monitor when a person is in fact at home. Moreover, the EPBS cannot determine who is at home.

Signal-transmitting devices also have been used to indicate the location of the device's user relative to other wired or wireless communications devices connected to a communications system. This technology is embodied in, for example, U.S. Pat. No. 5,428,663, which pertains to a system for automatically forwarding calls to wired or wireless device close to that person without the need for the person activating or deactivating the call forwarding system. However, this system only acts to forward calls made to a specific number. It does not identify the persons who are home nor does it provide telephone or other services depending on the identity of those persons.

It would be extremely desirable to develop technology for sending transmissions to a base station within the home that could more accurately indicate whether a person is in fact home. It would be even more desirable if the system could indicate whether that person had any specific characteristics, e.g., age, so that the telephone or other service provider could better tailor their services depending on who is at home.

The ability of a telephone network or other service provider "intelligently" to provide services to a household can improve household life. It also can open up new revenue opportunities for the service providers by making it possible to sell service enhancements that more fully satisfy customer needs.

SUMMARY OF THE INVENTION

The present invention is directed to solving these problems. The present invention accomplishes its desired results through the use of small transmitters that household members carry, either in their wallets or on their key chains, and a base station receiver in the home. Each transmitter periodically sends out a signal that identifies the transmitter and thus the person associated with that transmitter. The signal is strong enough only to be picked up by the base station in the home when the transmitter, and thus the person carrying it, is in the home. The base station assumes that the person is home when it receives a signal and, conversely, assumes that the person is not home when it has not received a recent signal.

When the base station detects a change in the identity of who is at home, i.e., receives a different signal or detects that a signal has not recently been received, it uploads that change information to a database in the telephone network. The telephone network then uses this information to "intelligently" provide services that depend on the identity of who is home. Examples of such "intelligent" services are:

"RingWhenHome": When there is a call for a household member who is not at home, the telephone would not ring, and thus, other household members who are at home would not be disturbed. The caller could then be transferred either to a voice mailbox or to another number.

"CallWaitingWhenHome": When the line is busy and there is a call for a household member who is not at home, the telephone would not give a call waiting signal, and thus the household member already on the phone would not be disturbed by the call waiting signal. The caller could then be transferred to a voice mailbox or to another number.

"IfNotHome": Various services could be restricted to be available only when a specific household member is at home. For example, outgoing calls to "900" telephone numbers or incoming calls from certain places could be denied unless a parent is at home.

In addition, the base station could be used as an "intelligent" home controller to customize other, non-telephone, shared resources in the home. For example, the base station could be wired into the home's heating and cooling system thermostat so that the home's temperature could be raised or lowered depending on who is at home. The base station could also be wired to a home security system so that it would automatically activate it when the last person leaves the house and deactivate it when the first person returns.

While the invention has been introduced in the context of a home controller and monitor, the present invention may have equal applicability in a work environment. Consequently, it is an object of the present invention to provide a system for allowing a service provider to more accurately determine who is at a given location. It is a further object of the present invention to permit a service provider to determine whether there is at that location a person with special characteristics. Based on this information, it is a further object of the invention to permit the telephone or other service provider to provide services "intelligently" tailored to meet the needs of those persons present.

BRIEF DESCRIPTION OF THE DRAWINGS

FIG. 3A depicts a typical physical layout of a base station according to the present invention.

FIGS. 10A and 10B are flow charts depicting an embodiment of the RingWhenHome aspect of the present invention using voice recognition means to identify the person being called.

FIG. 12A depicts the record layout of the database of restricted outbound telephone numbers for the IfNotHome aspect of the present invention.

FIG. 12B depicts the record layout of the database of restricted inbound telephone numbers for the IfNotHome aspect of the present invention.

DETAILED DESCRIPTION OF THE INVENTION

Figure 1A:
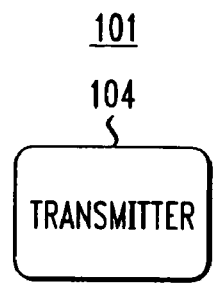
FIGS. 1A and 1B depict typical physical layouts of a transmitter according to the present invention.

The present invention keeps track of which household members are at home at any given time and uses that information to provide telephone and other services that depend upon who is home. Although the present invention will be described in the context of a home controller or monitor, its principles easily may be extended to a business or work environment.

The invention consists of a small transmitter that each household member can carry, either in a wallet or on a key chain; a base station located in the home for receiving transmissions emitted by the transmitters; a base station Who's_Home database; a network Who's_Home database; and various network facilities depending on the service to be provided.

The transmitter is designed to fit in a wallet or on a key chain because people almost always take their wallets and/or their keys when they leave home. This provides a means for accurately determining when a person is or is not at home, since if the wallet or keychain containing the transmitter is at home, the person also likely is at home. In addition, because people do not usually permit other household members to carry their wallets or their keys, the present invention can more accurately determine that the specific person associated with a particular transmitter is or is not home. This represents a substantial improvement over prior transmitter/base station systems such as the AT&T EPBS system, which did not permit an accurate determination of whether a particular person was home.

Throughout the following detailed description of the invention, when the same reference numeral is used, the numeral refers to the same component or step consistently throughout the Figures.

Figure 1B:
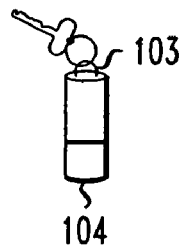
Figure 2:
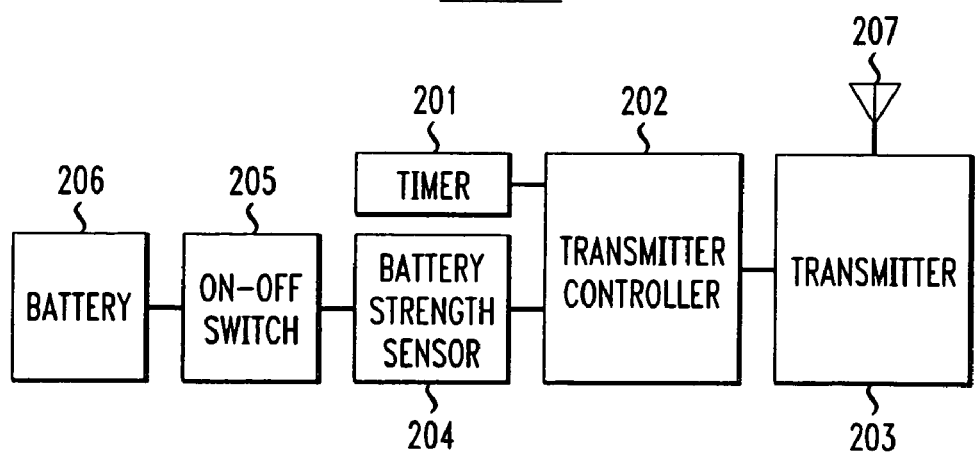
FIG. 2 is a block diagram of a transmitter.

FIGS. 1A and 1B depict possible physical embodiments of the transmitter. As shown in FIG. 1A, the transmitter 101 may consist of a small card, for example, 54×86×5 mm in dimension, made of plastic or other material, a battery compartment 104, a battery (not shown), and a light emitting diode (LED) (not shown). In FIG. 1B, the transmitter consists of a tag 102 with a through hole 103, a battery compartment 104, a battery (not shown), and a LED (not shown). FIG. 2 is a block diagram that shows in more detail the components of a transmitter 101, 102 used in the present invention, showing timer 201, transmitter controller 202, and radiotransmitter 203 that transmits via antenna 207. The transmitter also contains battery 206 and battery strength sensor 204, as well as on-off switch 205.

Figure 3B:
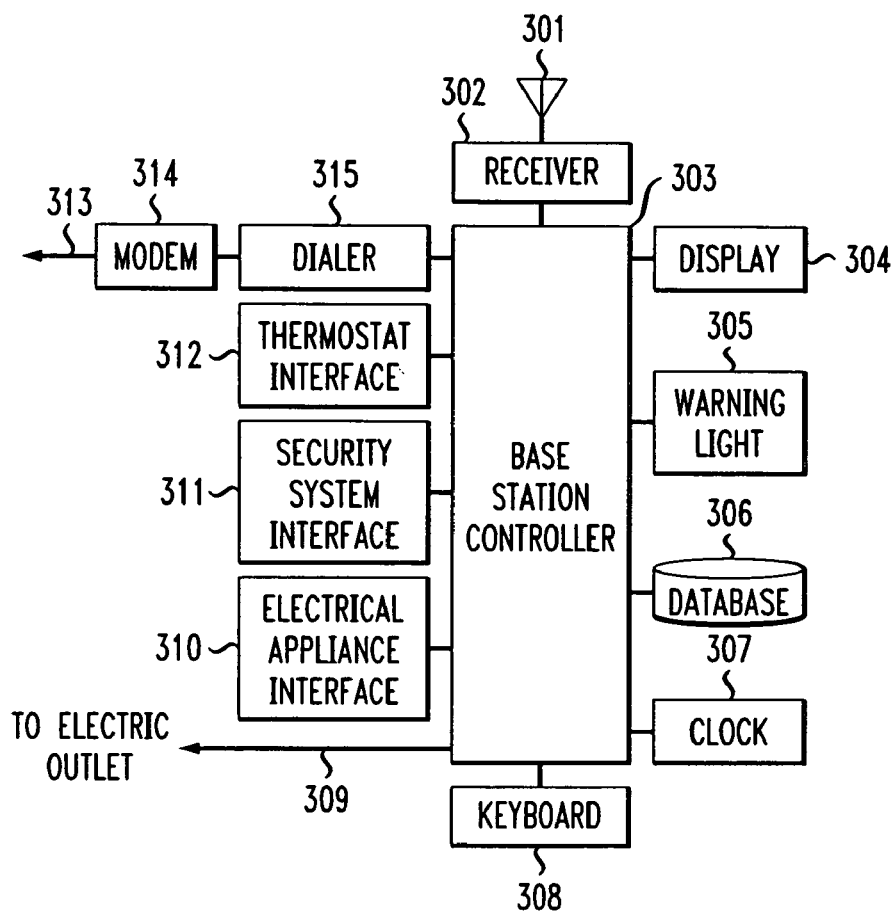
FIG. 3B is a block diagram of the physical layout of a base station.

FIG. 3A is a depiction of a possible physical layout of the base station of the present invention. As shown in FIG. 3A, the base station 300 may comprise a base station unit 320, with a receiver antenna 301, display screen 304, keyboard 308, and warning light 305. The base station plugs into the home's electrical supply via power cord 309. The base station could also be equipped with a battery-powered backup so that the information in the database would not be lost in the event of a power failure. The base station is connected to the home's telephone system via telephone wire 313. In addition, the base station may be connected to other appliances in the home such as the home's lighting system via electrical wire 310, to the home's thermostat via wire 312, or to the home's security system controller via wire 311. FIG. 3B is a block diagram of the base station, showing the same components of the base station in block diagram form. The base station shown in FIG. 3B contains receiver antenna 301 and receiver 302, processor 303, display 304, and keyboard 308. The base station processor 303 may be a CPU, an ASIC, an FPGA, or any other processor that provides equivalent processing capacity. The base station also contains a clock 307 and warning light 305. The base station plugs into an ordinary electrical outlet for power via electrical input 309. The base station also plugs into a wire line telephone jack via telephone input/output port 313, and is capable of automatically initiating telephone calls to the local network controller via dialer 315 and modem 314. As also shown in FIG. 3A, the base station shown in FIG. 3B may also be connected to other electrical appliances in the home, for example, the home's lights, via electrical wire 310, to the home's thermostat via line 312, or to the home's security system via line 311.

Upon installation of the base station 300, each household member's transmitter 101, 102 is programmed into the base station database by entering the transmitter's unique identification number into the database using keyboard 308. At this time, other information relating to a specific transmitter 101, 102 also can be entered. For example, a transmitter can be programmed to be "always home" so that the household member is treated as though he or she is at home even if a signal has not been received. Display 304 permits a user to see the information for each transmitter entered into the database. The display 304 also permits a user to see which transmitters are shown as "at home" at any given time.

Figure 4A:
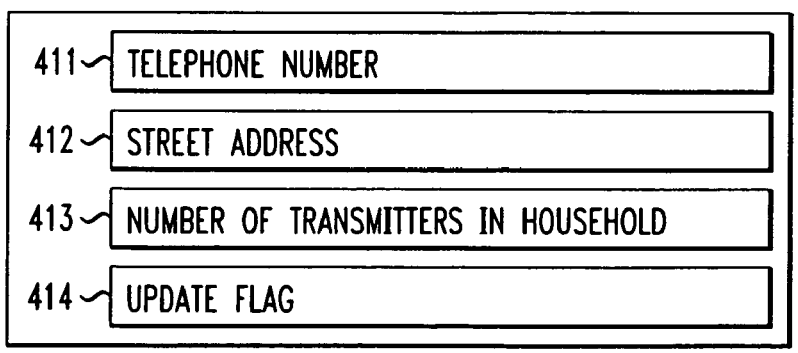
FIGS. 4A–4C depict the record layout of the Who's_Home database.
Figure 4B:
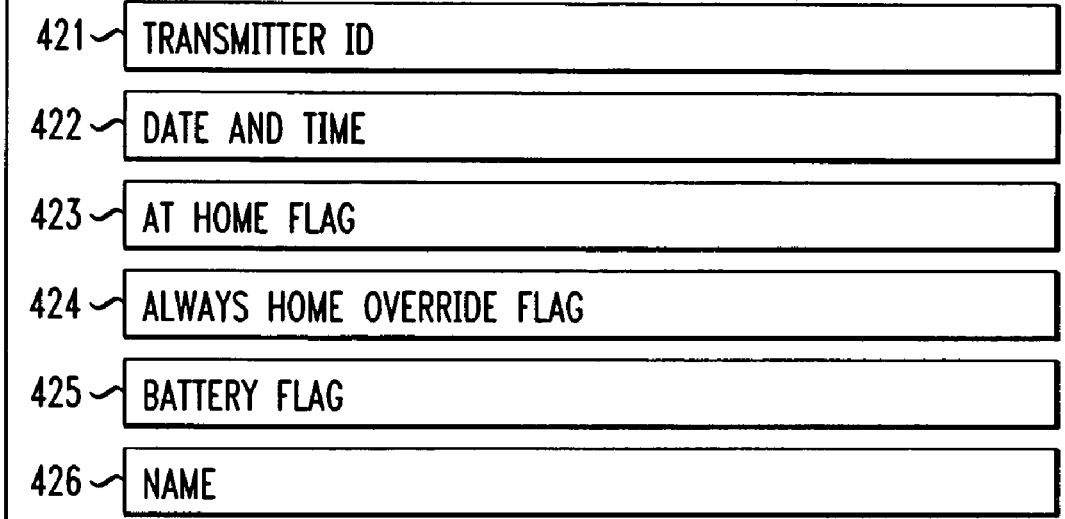

The base station processor 303 maintains a base station Who's_Home database 306 that indicates which household members are home and which are not home. FIGS. 4A and 4B depict the contents of a record in the base station database 306. FIG. 4A depicts the contents of a header record 410 that contains information relevant to all members of the household, such as telephone number 411, street address 412, number of transmitters in the household 413 (i.e., number of additional records in the database), and an update flag 414. FIG. 4B depicts the contents of a household member record 420 in the base station Who's_Home database 306. This record contains information such as the transmitter ID correlating to that household member 421, the date and time 422 of the last transmission received from that transmitter, an "at home" flag 423 indicating whether the transmitter is flagged as "at home," an "always home" flag 424 indicating whether the transmitter is always flagged as being "at home," a battery flag 425 indicating whether the transmitter battery is at low strength, and the name of the household member 426 associated with that transmitter ID.

Figure 4C:
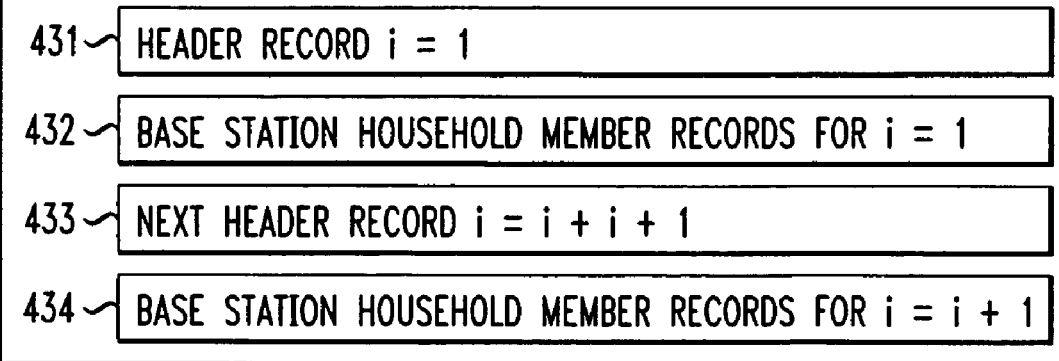

The invention also comprises a network Who's_Home database 430 as shown in FIG. 4C. This database 430 would contain a record 431 corresponding to the header record from the base station Who's_Home database for the first telephone number that is subscribed to one of the telephone services that uses the Who's_Home database (e.g., Ring-WhenHome) and a record 432 containing all of the base station Who's_Home database records that correspond to that header record 431, indicating who is home and who is absent. The network Who's_Home database would then contain a record 433 for the next telephone number and the corresponding household member records 434, etc.

Figure 5:
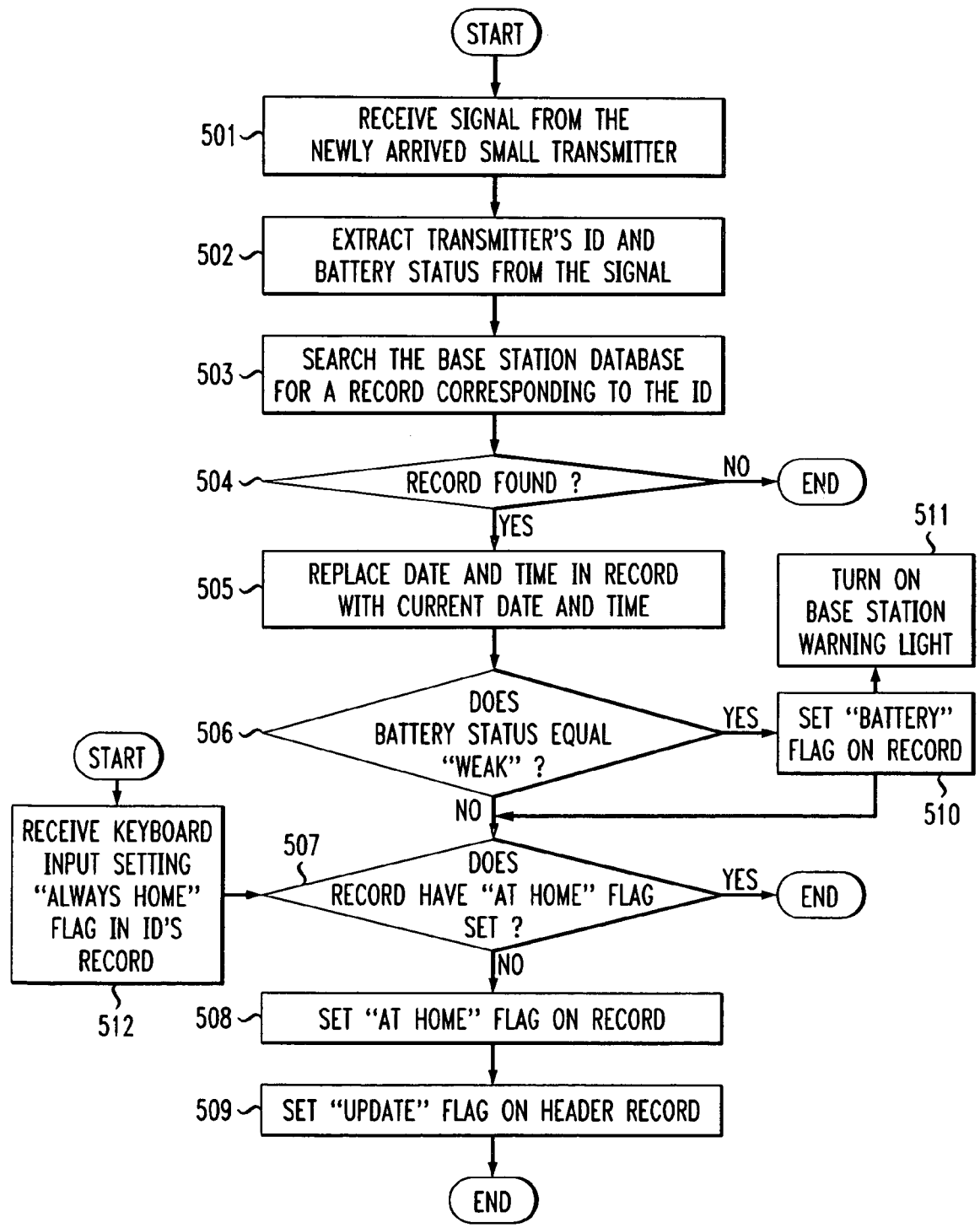
FIG. 5 is a flow chart showing how the transmitter and base station work together to update the base station Who's_Home database when a household member arrives home.

FIG. 5 is a flow chart that shows an example of how the transmitter and receiver would operate together to update the base station Who's_Home database when a household member arrives home. Periodically, perhaps every 15 minutes or less, the transmitter 101, 102 sends out via transmit antenna 207 a unique signal 210 that identifies the transmitter. The power of the signal 210 is too weak to be received when the person is not at home, but can be received by the base station 300 when the person carrying the transmitter is in close proximity to the base station, i.e., is at home. As shown in FIG. 5, when the signal 210 is received by the base station receiver 302 at step 501, the base station processor 303 extracts the transmitter's ID from the signal at step 502, and at step 503 searches the base station Who's_Home database 306 for a record 420 corresponding to the ID from that transmitter 101, 102. If a record corresponding to that ID is not found at step 504, the base station processor 303 ends the processing for that signal. If a record 420 corresponding to that ID is found, the base station processor 303 at step 505 replaces the date and time in the record with the current date and time. The base station 300 then takes step 507 to see whether the record is set as "at home." If the answer at step 507 is yes, the base station 300 completes processing the signal. If the answer at step 507 is no, the base station 300 sets the "at home" flag on the record 420 in the base station Who's_Home database 306 at step 508, sets the "update" flag in the database header record 410 at step 509, and completes processing the signal.

Figure 6:
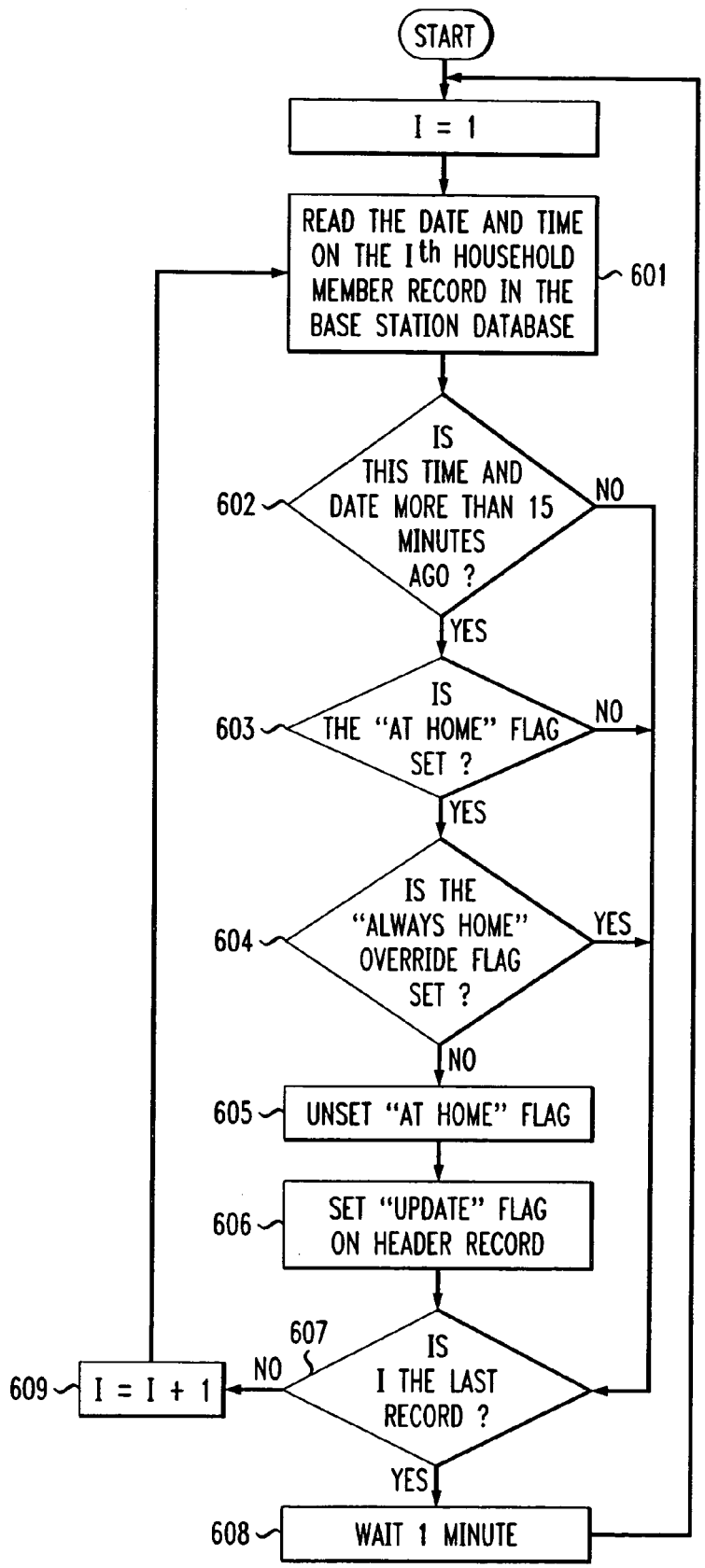
FIG. 6 is a flow chart showing how the base station Who's_Home database is updated after a household member leaves home.

FIG. 6 shows how the base station 300 operates to update the base station Who's_Home database 306 after a household member leaves home. At step 601, the base station 300 reads the date and time shown in each record 420 corresponding to a household member. If the date and time shown in the record 420 at step 602 is older than some predetermined time, for example, more than 15 minutes before the present date and time, the base station checks the record 420 at step 603 to determine at step 604 whether the "at home" flag is set or whether the "always home" flag is set. If the "at home" flag is set, the base station 300 then checks at step 604 to see whether the "always home" flag is set. If the answer at step 604 is yes, i.e., the household member associated with that record 420 is deemed to be "always home," the base station proceeds to step 607 to see whether the record just checked is the last record. If the answer at step 607 is yes, the base station proceeds to step 608 to wait one minute and then proceeds back to the beginning to start checking the records again as described above. If the answer at step 607 is no, i.e., the record checked is not the last record, the base station proceeds to step 609 to check the next record as described above. If the "always home" flag for that record 420 is not set, the base station removes the "at home" flag from the record 420 at step 605 and at step 606 sets the "update" flag in the database header record 410. The base station then returns to step 607 to continue this process for every record 420 in the base station database 306, continually checking the "at home" status of the household members.

Figure 7:
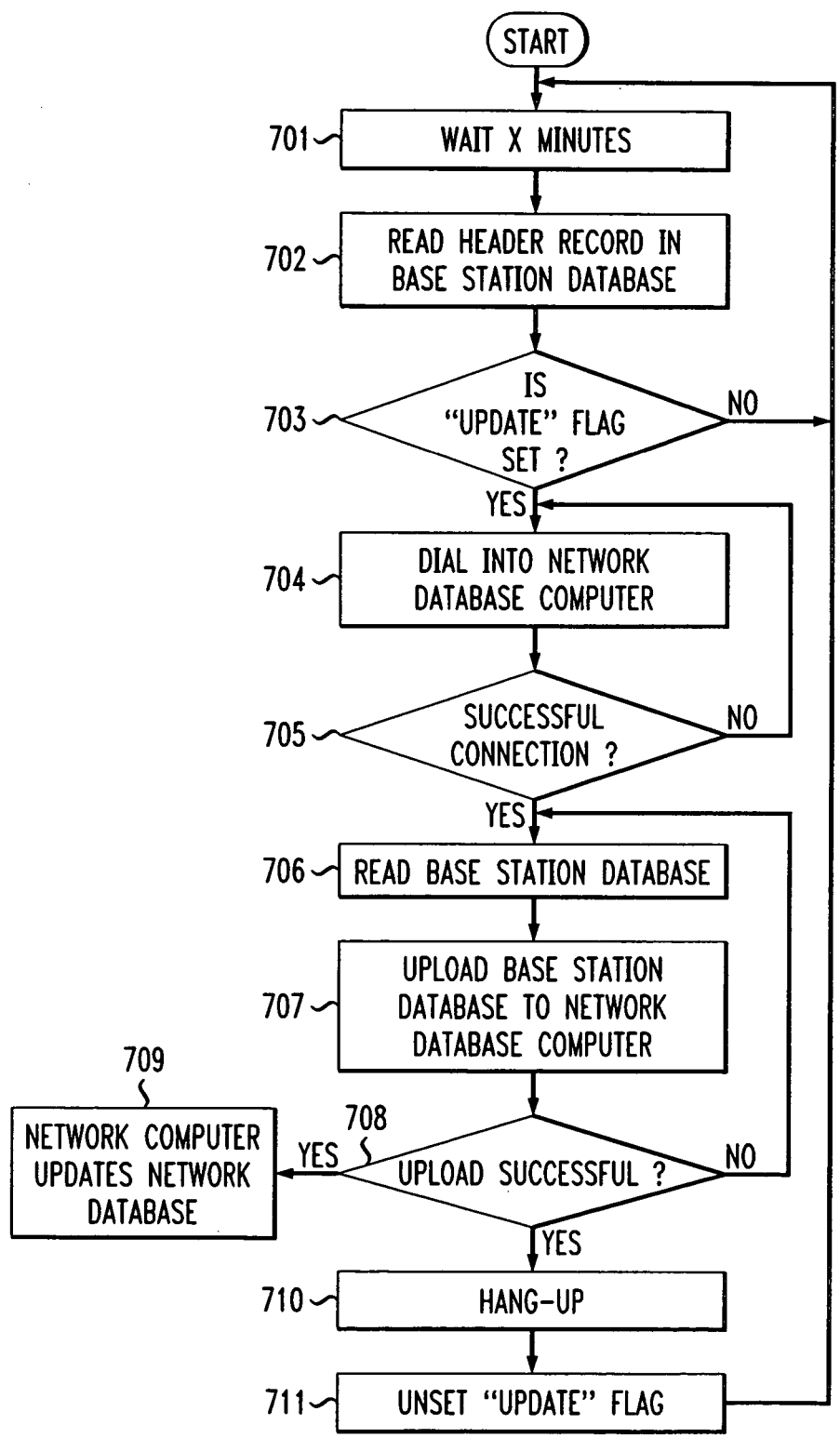
FIG. 7 is a flow chart showing how the network database is updated.

When there is a change in the "at home" status of a record in the database, i.e., a change in who is at home, the base station 300 initiates a telephone call to the local telephone network to update the network's database 430. FIG. 7 is a flow chart depicting the manner in which the network database 430 is updated. After waiting a period of time, for example, 15 minutes, the base station at step 702 reads the header record 410 in the base station Who's_Home database 306. The waiting period may be used to allow the local database 306 to complete all updates to the records therein, for example, as a group of household members enters or reenters the home.

If at step 703 the "update" flag in the header record 410 is set, the base station 300 dials into the local network database 430 computer at step 704 via the dialer 315 and modem 314 shown in FIG. 3. Upon connecting with the local telephone network controller at step 705, the base station 300 uploads the base station Who's_Home database 306 to the network computer at step 707. This may be accomplished by any number of conventional data transfer protocols, such as TCP/IP. When the data transfer is complete at step 708, the network computer updates the network Who's_Home database 430 at step 709. The base station then disconnects the call at step 710 and clears the "update" flag in the base station database header record 410 at step 711.

The network Who's_Home database then is used by the local telephone network to provide various "intelligent" telephone services to the subscriber depending on who is home.

One such service, which may be called "RingWhenHome," would use the local telephone network's "Who's_Home" database to selectively permit the telephone to ring if the recipient of the telephone call is home or, if the recipient of the telephone call is not at home, to take a pre-specified action such as immediately transferring the caller to a voice mailbox or to a pre-specified forwarding number without ringing the phone.

Figure 8:
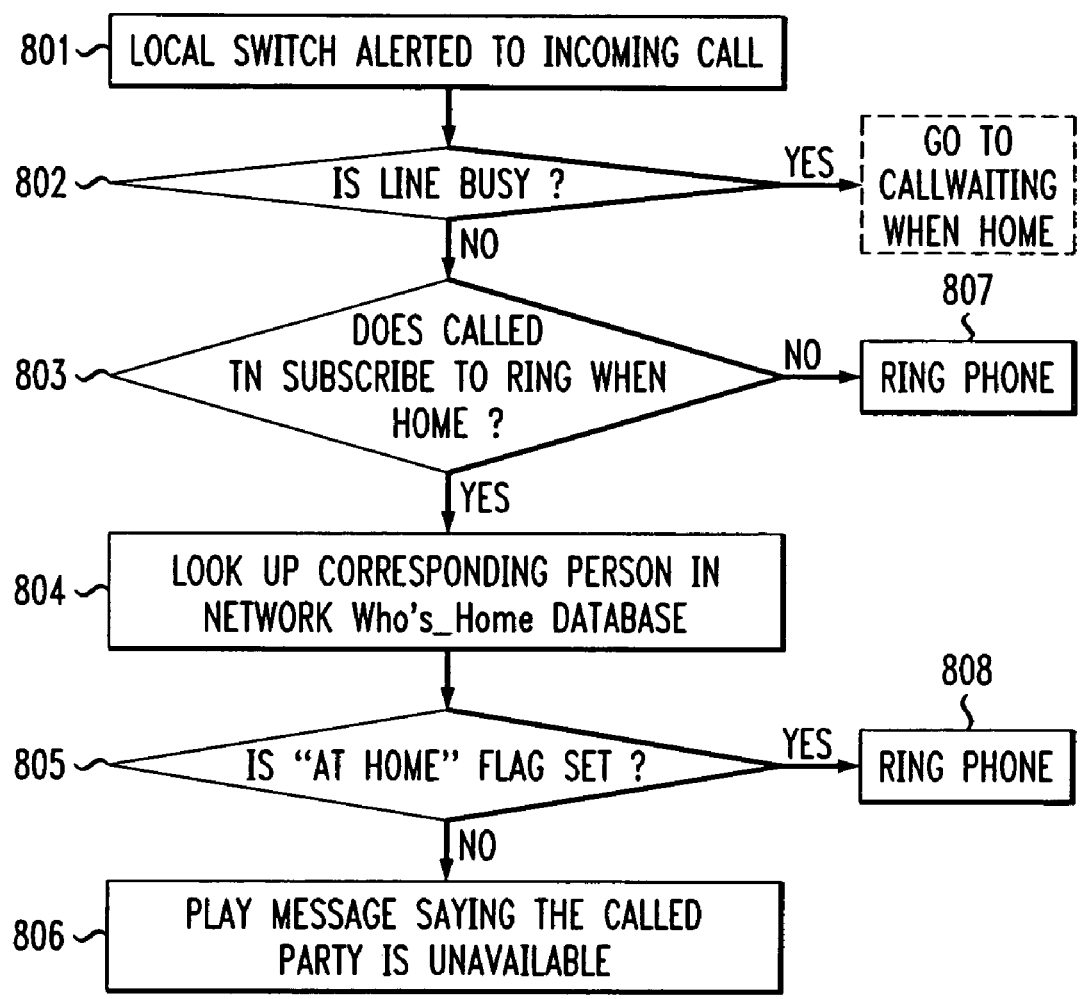
FIG. 8 is a flow chart depicting an embodiment of the RingWhenHome aspect of the present invention using a plurality of different telephone numbers, each of which having a distinctive ring.

In one embodiment of RingWhenHome, shown in FIG. 8, use would be made of a currently existing service provided by Verizon, called "Distinctive Ring™." ("Distinctive Ring™" is a registered trademark of Verizon) Distinctive Ring™ permits a telephone subscriber to have multiple telephone numbers or telephone extensions assigned to the same wire telephone line, each of which numbers causes the telephone to ring differently. FIG. 8 is a flow chart showing this embodiment of the present invention. In this embodiment, when the local telephone network switch receives an incoming call at step 801, the network first takes step 802 to see whether the line is busy. If the answer at this step is yes, the switch transfers processing to CallWaitingWhenHome, as described in FIG. 9 and in more detail below. If the answer at step 802 is no, the local network controller then checks the local network subscriber database at step 803 to see whether the called telephone number subscribes to the RingWhenHome service. If the answer at step 803 is no, the switch proceeds to step 807 and the telephone rings. If the answer at step 803 is yes, the telephone network controller proceeds to step 804 to look up the corresponding person in the network's Who's_Home database 430 to determine whether the transmitter 101, 102 associated with that number has been flagged as "at home" by the base station database 306 in the home. If the answer at step 805 is yes, the network controller assumes that the called party is at home and proceeds to step 808, permitting the telephone to ring. However, if the answer at step 805 is no, the network controller assumes that the called party is not at home and does not ring the phone. Instead, the network controller proceeds to step 806 and routes the telephone call in accordance with the instructions that the owner of the transmitter has preselected. For example, the telephone network controller may send a signal that makes the caller think the telephone is ringing, i.e., the caller gets "ring, no answer." Alternatively, the network controller may transfer the caller to a voice mailbox or to a pre-specified forwarding number. It is highly possible that the RingWhenHome system could be configured to permit a user to select and change these options at will, thereby enhancing their usefulness to the consumer.

Figure 9A:
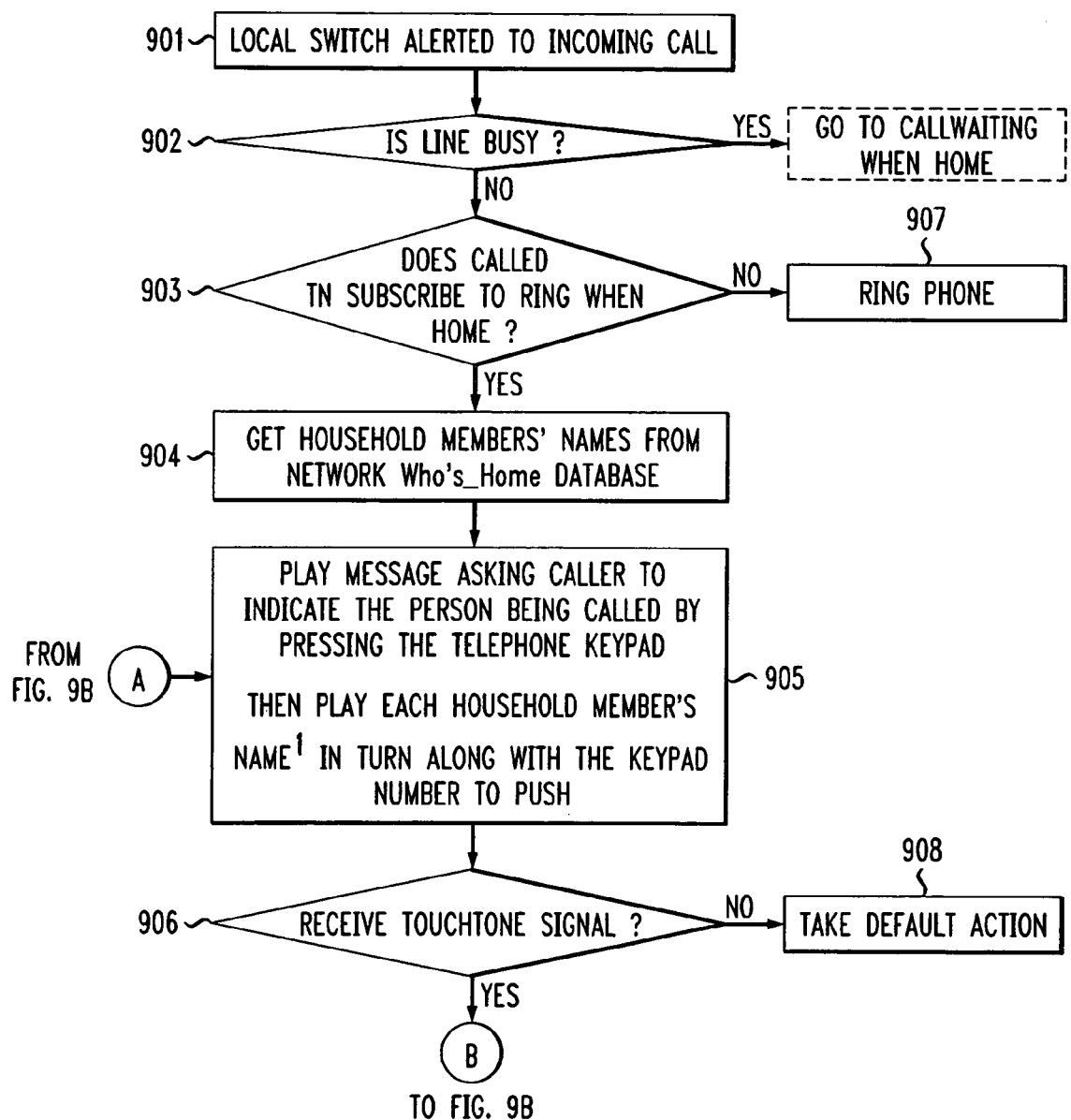
FIGS. 9A and 9B are flow charts depicting an embodiment of the RingWhenHome aspect of the present invention using touchtone means to identify the person being called.
Figure 9B:
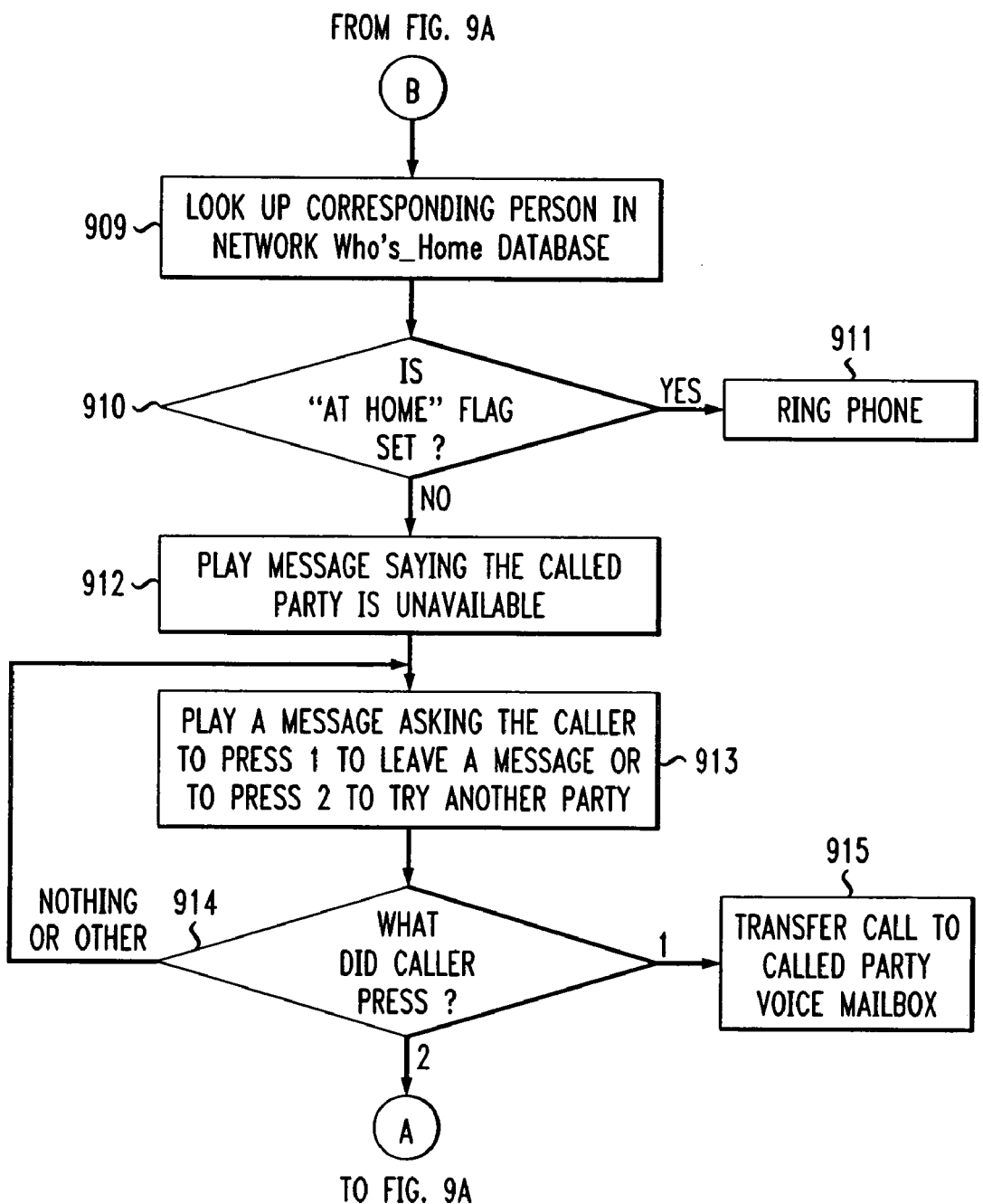

In another embodiment of RingWhenHome, instead of each household member being assigned a unique telephone number or extension as described above, all household members would continue to share the same telephone number. In this embodiment, shown in the flow charts at FIGS. 9A–10B, when the local network switch receives an incoming call at step 901, the caller is greeted with an announcement at step 905 asking the caller to indicate the person whom he or she is calling. The response to this announcement can be obtained in many ways. For example, as shown in FIGS. 9A and 9B, existing touch-tone technology could be used. In such a case, the telephone network controller could play an announcement such as the following:

If you're calling John, press 1
If you're calling Mary, press 2
If you're calling Joe, press 3

Figure 10A:
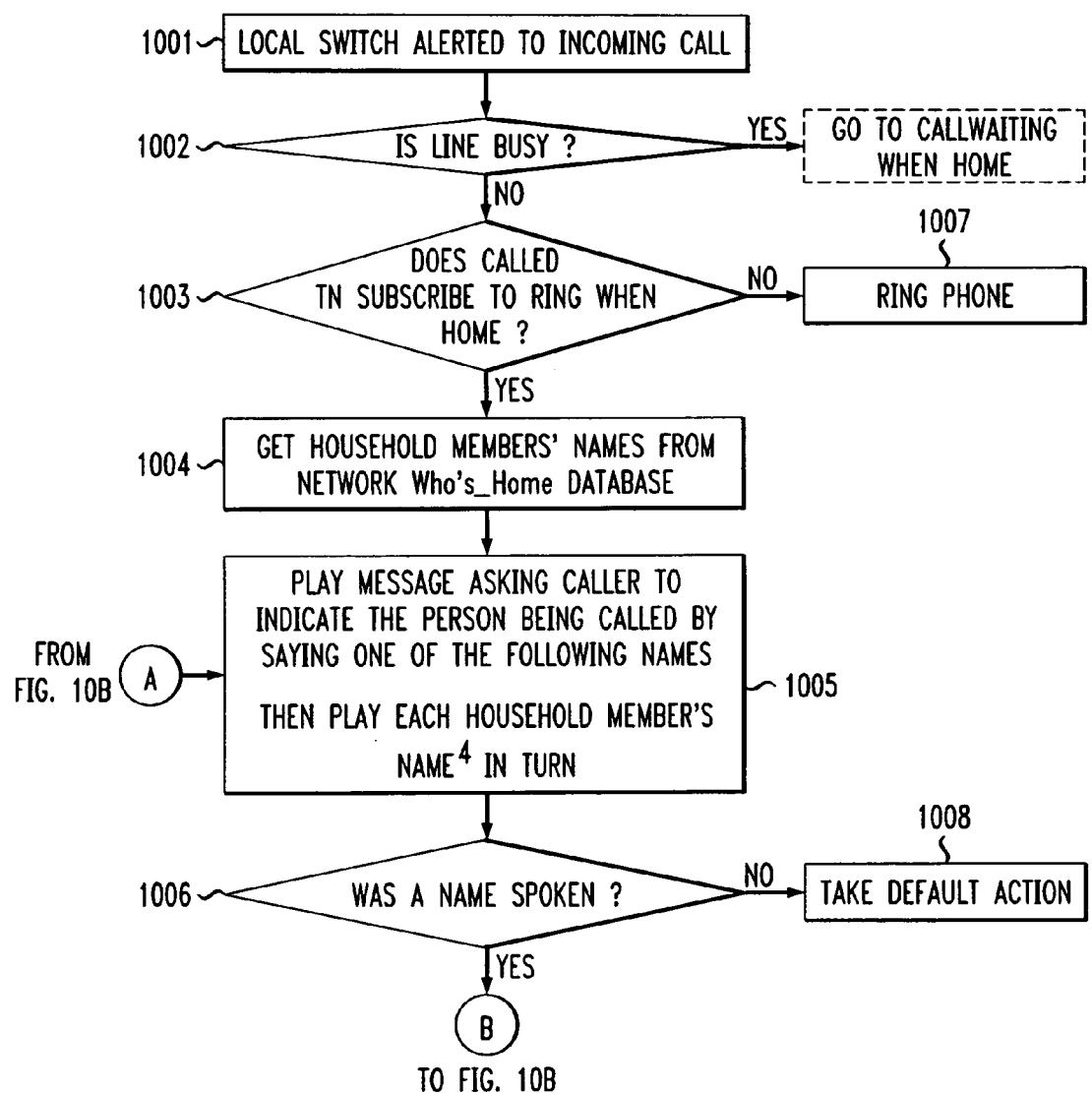

Alternatively, speech recognition technology could be used as depicted in FIGS. 10A and 10B, with an announcement similar to the following announcement being played:

"Please state whether you are calling John, Mary, or Joe."

Both touch-tone and speech recognition technology are well-known and well-established in the telecommunications art, and one skilled in the art could readily understand how this technology could be used in the present invention. Both touch-tone and speech recognition technology also may be used to select the call recipient via an extension off the main telephone number. In any of these cases, the caller also may be given an option to select multiple call recipients or may be given an option to select "any" household member as the call recipient.

Using the flow chart at FIGS. 9A and 9B as exemplary embodiments of the present invention, when an incoming call is received by the local telephone network controller, the local telephone network controller first checks at step 902 to determine whether the line being called is busy. If the answer at this step 902 is yes, the network controller proceeds to process the call in accordance with CallWaitingWhenHome as described in more detail below. If the answer at step 902 is no, the network controller then proceeds to step 903 to determine whether the telephone number being called subscribes to RingWhenHome. If the answer at this step 903 is no, the network controller permits the call to go through and the telephone number to ring. If the answer at step 903 is yes, the network controller proceeds to step 904 and gets the names of household members from the network's Who's_Home database 430 and proceeds to step 905 to ascertain the identity of the person being called as described in detail above. After the selection of the called party is made at step 906, the network controller proceeds to steps 909–910 to check the network Who's_Home database 430 as described above to determine whether the called party is at home. Based on the answer at steps 909 and 910, the network controller would take the appropriate action to route the call. For example, if the answer at step 910 is yes, i.e., the person being called is "at home," the network controller permits the phone to ring. If the answer at step 910 is no, i.e., the person being called is not "at home," the network controller does not complete the call. Instead, the controller may play a message at step 913 asking, for example, the caller to either leave a message or select another call recipient. The network controller checks at step 914 to see what option the caller selected, and takes the appropriate action at step 915, e.g., transfers the caller to a voice mailbox.

Another use for the present invention permits household members who are at home but who do not wish to be disturbed to simply turn off their transmitters. Because the base station 300 would then not receive a signal from that transmitter 101, 102, it would place an entry in the base station's Who's_Home database 306 and upload that information to the network Who's_Home database 430. Because the network's Who's_Home database 430 would then show that person as not being home, telephone calls would be treated accordingly under RingWhenHome. That is, calls to that person would silently be rerouted while other family members would continue to receive calls.

An additional embodiment of the present invention may be known as "CallWaitingWhenHome." The service encompassed by this embodiment is similar to the "RingWhenHome" embodiment but differs in when the service would apply. "RingWhenHome" applies when the telephone is not busy and uses the apparatus and system of the present invention to determine whether the telephone should ring. CallWaitingWhenHome would apply when the telephone is busy and determines whether a call waiting signal should issue.

Figure 11A:
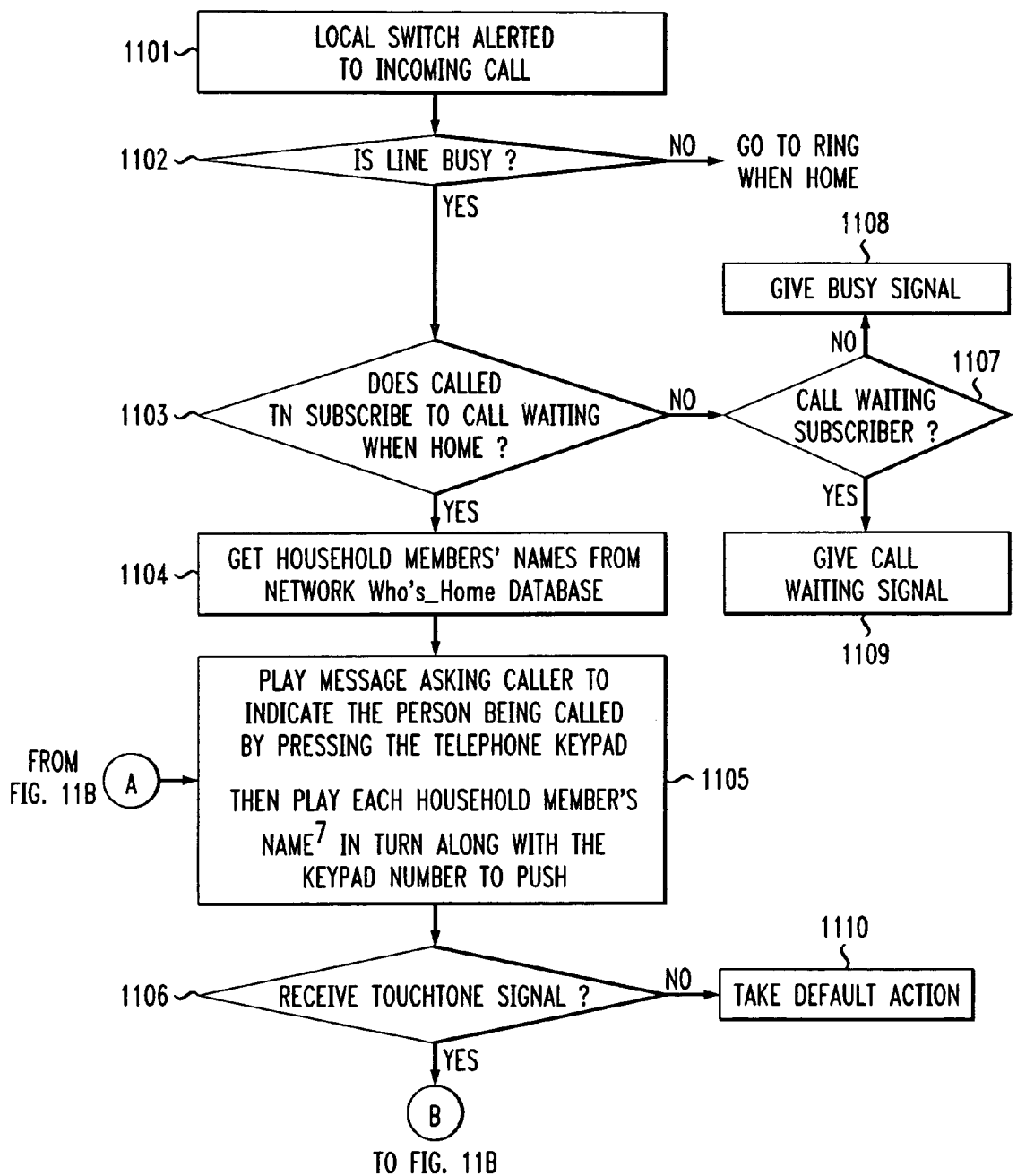
FIGS. 11A and 11B are flow charts depicting an embodiment of the CallWaitingWhenHome aspect of the present invention using touchtone means to identify the person being called.
Figure 11B:
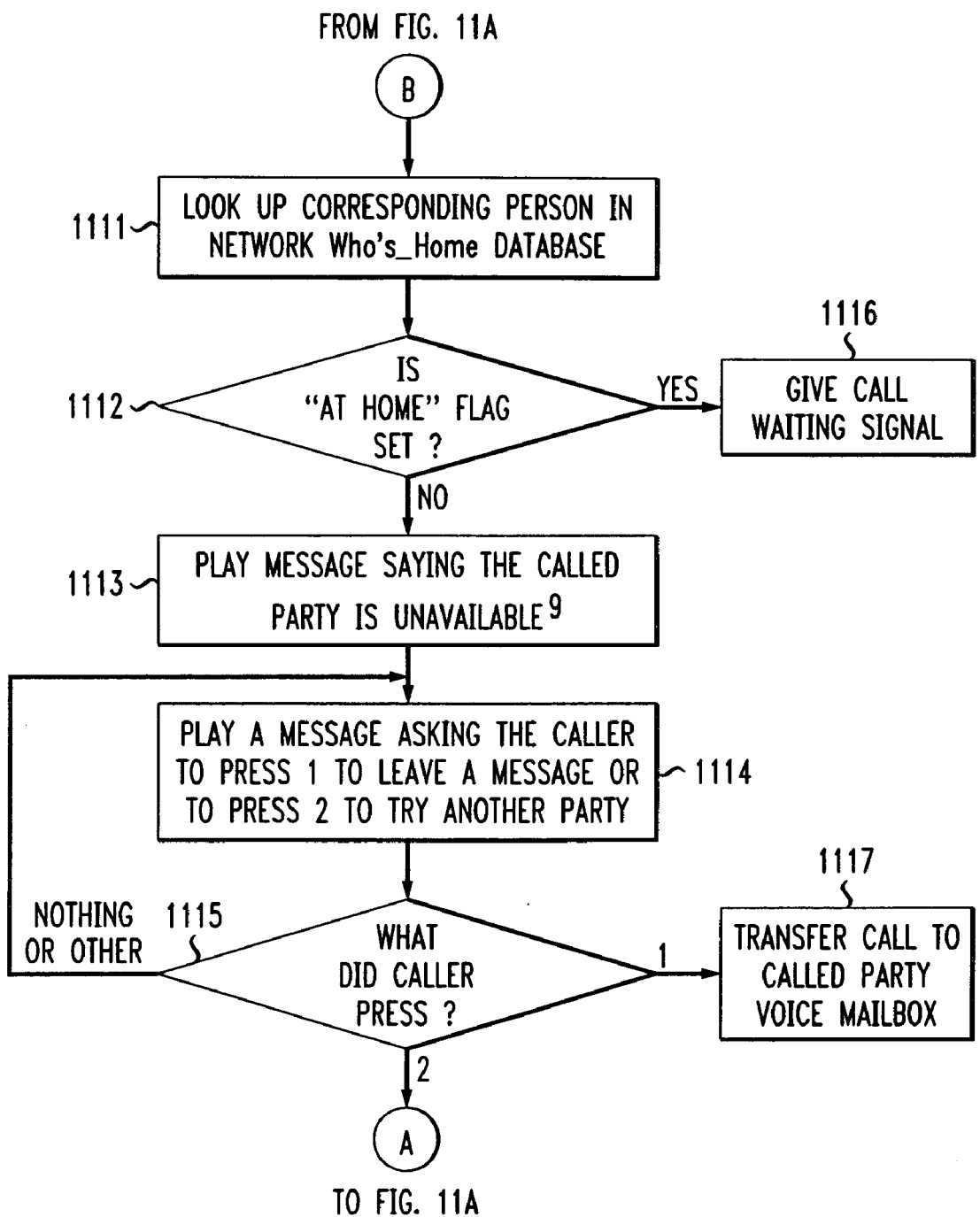

CallWaitingWhenHome operates in a manner similar to RingWhenHome. As shown in the flow chart at FIGS. 11A–11B, when the local network switch receives an incoming call at step 1101, the network checks the network subscriber database at step 1103 to determine whether the number being called subscribes to CallWaitingWhenHome. The identity of the called party may be determined in any of the ways described above for "RingWhenHome," utilizing either multiple telephone numbers for a single line in the home or touch-tone or voice recognition technology to permit the caller to indicate the person who is being called.

If the answer at step 1103 is yes, the telephone network controller then proceeds to steps 1111 and 1112 and looks in the network's Who's_Home database 430 to determine whether the transmitter associated with that number has been flagged as "at home" by the base station database 306. If the answer at step 1112 is yes, the network controller assumes that the called party is at home and proceeds to step 1116, permitting a call waiting signal to sound. However, if the answer at step 1112 is no, the network controller assumes that the called party is not at home and does not sound a call waiting signal. Instead, the network controller proceeds to step 1113 and routes the telephone call in accordance with the instructions that the owner of the transmitter has preselected. For example, the telephone network controller may send a signal that makes the caller think the telephone is ringing, i.e., the caller gets "ring, no answer." Alternatively, the network controller may proceed to step 1114, play a message asking the caller to leave a message or select another call recipient, and take appropriate action based on the choice made by the caller.

As seen above, in each of "RingWhenHome" and "CallWaitingWhenHome," it is possible give the caller an option to select another call recipient before being transferred to voice mail. This could be accomplished by the playing of an announcement as follows:

"The person you are calling is not available. If you would like to select another recipient of the call, press 1. If you would like to leave a message, press 2."

Of course, this option could also be provided via voice recognition technology as well.

In addition, the base station could also be programmed to accept and recognize signals from the transmitters of non-household members, e.g., visitors to the home. In one embodiment, the unique ID number for the visitor's transmitter 101, 102 could be entered into the base station database 306 via the keyboard 308. Alternatively, the base station 300 could be programmed to automatically create a "temporary" record whenever a signal from a non-household member's transmitter is received. In either case, the base station processor 303 would then create a "visitor" record in the base station's Who's_Home database 306, which would be uploaded into the local network controller's Who's_Home database 430. The local network controller could then flag the network's record for the visitor's transmitter to forward calls to the telephone number of the household member being visited. The "temporary" record would automatically be deleted by the base station's Who's_Home database 306 when a signal from the corresponding transmitter has not been received for a period of time. Alternatively, the base station 300 could provide a means for manually deleting that record from the database 306.

Another example of a telephone service that could use the network's Who's_Home database may be called "IfNotHome." Various telephone network services could be restricted to be available only when a specific household member is at home. The IfNotHome service can be used to restrict both outgoing and incoming calls. For example calls to "900" telephone numbers or calls from certain numbers could be denied unless a parent is home.

Outgoing calls could be restricted as follows. The list of restricted outbound telephone numbers and the persons who must be home for calls to those numbers to be completed could be established at the time the customer subscribes to IfNotHome. In this embodiment of IfNotHome, the subscriber would select the outgoing telephone numbers that are to be restricted and the identity of the person or persons who must be home in order to allow calls to that telephone number to be completed. These restricted outgoing telephone numbers and the corresponding persons who must be home would then be recorded in a network IfNotHome (Outbound Version) database 1201 maintained by the local telephone network. A typical record layout for this database is shown in FIG. 12A. Each record in the IfNotHome (Outbound Version) database 1201 would contain a field 1211 containing a telephone number that subscribes to IfNotHome (Outbound Version), a field 1221 containing the telephone numbers that can only be called from the telephone number in field 1211 if at least one specified person is home, and fields 1231, 1241 containing the transmitter IDs of household members at least one of whom must be present for the telephone call from the telephone number in field 1211 to a telephone number in field 1221 to be completed. In this embodiment of IfNotHome, the subscriber easily could make changes to the list of restricted numbers or to the identity of the required persons by telephone, e-mail, or other communication to the network's customer service department.

Alternatively, the list of restricted outbound telephone numbers and corresponding persons who must be home could be created by the subscriber upon setup of the base station 300 by having the subscriber input the list of restricted telephone numbers and the list of required persons into an IfNotHome outgoing number database in the base station 300. The base station would then upload the home IfNotHome outgoing number database to the network's IfNotHome (Outbound Version) database 1201 as shown in FIG. 12A. This home IfNotHome outgoing number database may be updated or revised at any time by the user making the appropriate changes to the database. When there is a change to the home IfNotHome database outgoing number database, the base station 300 uploads the change to the network IfNotHome (Outbound Version) database 1201. To prevent unauthorized revision to the list of restricted numbers or required persons, access to the list could be controller by use of a password or other security means.

Figure 13:
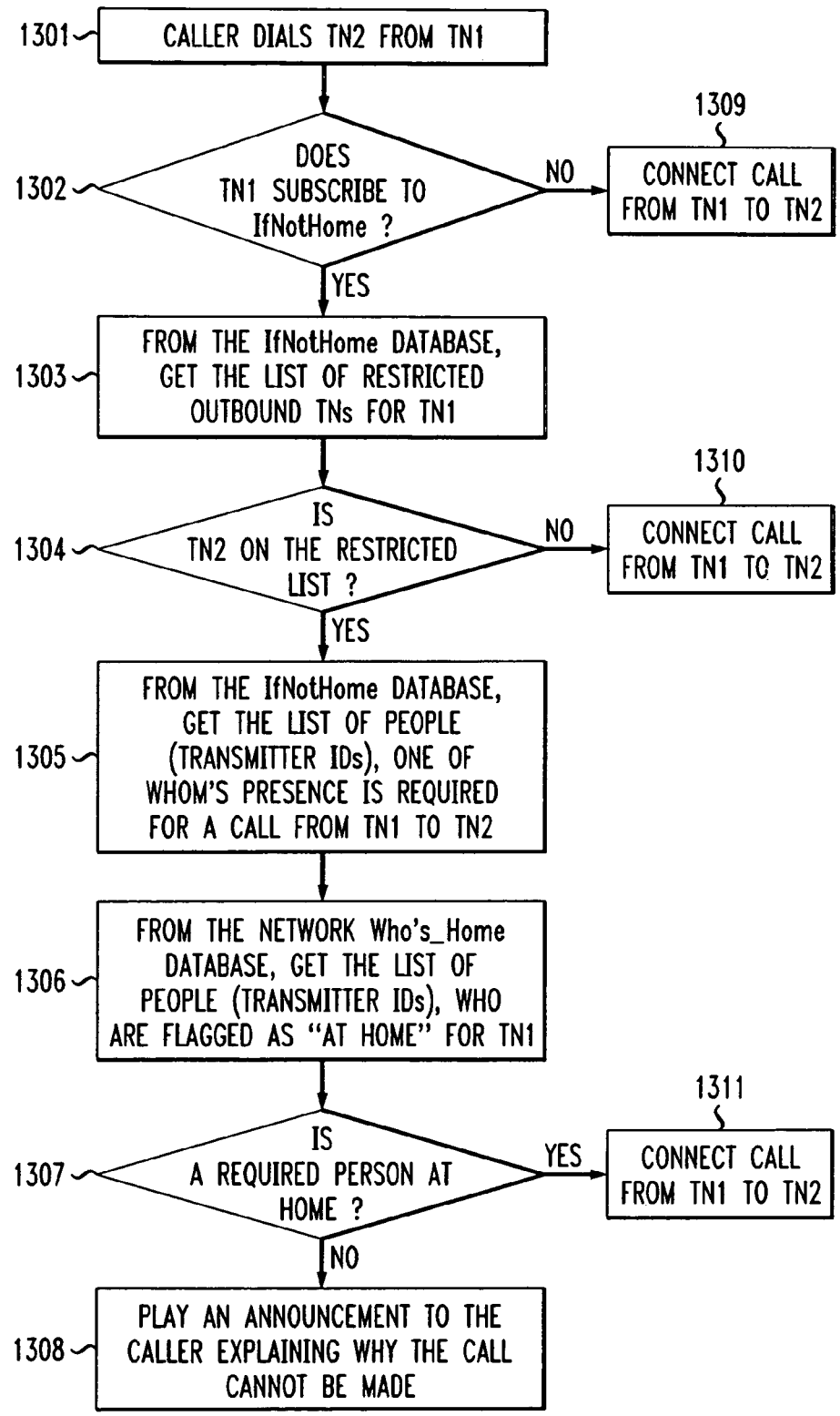
FIG. 13 is a flow chart depicting the use of the IfNotHome aspect of the present invention to block outbound calls.

FIG. 13 is a flow chart showing how IfNotHome would work to restrict outgoing calls using the present invention. When a household member initiates an outbound call at step 1301, the telephone network controller first proceeds to step 1302 to determine whether the call is originating from a line that subscribes to IfNotHome. If the answer at step 1302 is no, the telephone network controller proceeds to step 1309, and permits the call to be completed. If the answer at step 1302 is yes, the telephone network controller then proceeds to step 1303 to get the list of restricted outbound telephone numbers from the network's IfNotHome database 1201, and then to step 1304 to search the IfNotHome database 1201 to see whether the called number is restricted to be available only when certain household members are home. If the answer at step 1304 is no, i.e., the number is not on the IfNotHome database, the telephone network controller proceeds to step 1310 and permits the call to be completed. If the answer at step 1304 is yes, i.e., the number is on the IfNotHome database 1201 of restricted numbers, the telephone network controller then proceeds to step 1305 to check the IfNotHome database 1201 for the identity of household members who must be home before the call may be completed. The controller then proceeds to step 1306 to check the network Who's_Home database 430 to see the identity of those persons who are flagged as "at home" and then to step 1307 to check the network's Who's_Home database 430 to see whether a required household member is home. If the answer at step 1307 is yes, i.e., a required household member is home, the telephone network controller proceeds to step 1311 and permits the call to be completed. If the answer at step 1307 is no, i.e., a required household member is not home, the telephone network controller proceeds to step 1308 and takes a predetermined action, e.g., plays an announcement to the caller explaining why the call cannot be made.

Figure 14:
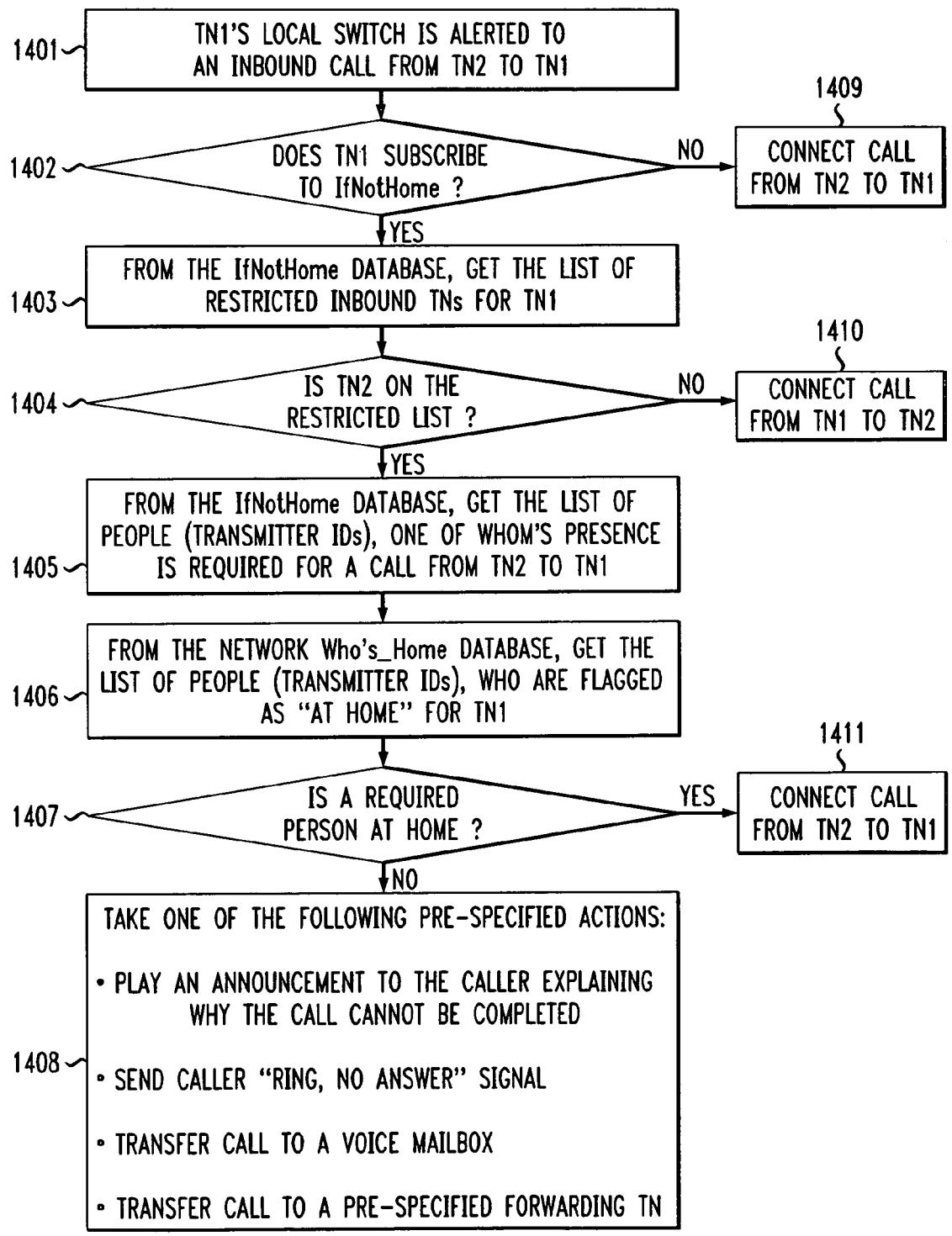
FIG. 14 is a flow chart depicting the use of the IfNotHome aspect of the present invention to block incoming calls.

Incoming calls could similarly be restricted. FIGS. 12B and 14 show how IfNotHome would restrict incoming calls. As shown in FIG. 12B, restricted incoming telephone numbers would be entered into a network IfNotHome (Inbound Version) database 1202 similar to the network IfNotHome (Outbound Version) database 1201 described above. Specifically, each record in the database 1202 would have a field 1212 containing a telephone number that is subscribed to IfNotHome (Inbound Version), a field 1222 containing the telephone numbers that can call the telephone number listed in field 1212 only if at least one required household member is home, and fields 1232, 1242 containing the transmitter IDs of household members at least one of whom must be present for the telephone call from the telephone number in field 1222 to the telephone number in field 1212 to be completed. As is the case with the IfNotHome (Outbound Version) database 1201, the network IfNotHome (Inbound Version) database 1202 would contain the information either provided by the subscriber at the time of subscription to IfNotHome (Inbound Version) or uploaded from a home IfNotHome (Inbound Version) database in the base station 300 established by the user. As with the network IfNotHome (Outbound Version) database 1201, the network IfNotHome (Inbound Version) database 1202 could be updated by the telephone company after the subscriber communicates with the customer service department by telephone, e-mail, fax, or other means, or through an upload of changes from the home IfNotHome (Inbound Version) database.

As shown in the flow chart at FIG. 14, if a call is made to a telephone line that subscribes to IfNotHome, the telephone network controller would first take step 1404 to check the IfNotHome database 1202 of restricted inbound telephone numbers to determine whether the incoming telephone number is restricted. If the answer at step 1404 is no, i.e., the telephone number is not restricted, the network controller proceeds to step 1410 and permits the telephone call to be completed. If the answer at step 1404 is yes, i.e., the number is on the database of restricted numbers 1202, the network controller proceeds to step 1405 and checks the IfNotHome database 1202 to determine the identity of a household member who must be home before the call can be completed, and then proceeds to steps 1406 and 1407 to check the network's Who's_Home database 430 to see whether a required household member is home. If the answer at step 1407 is yes, i.e., a required household member is home, the network controller proceeds to step 1411, and permits the call to go through. If the answer at step 1407 is no, i.e., a required household member is not home, the network controller proceeds to step 1408 and takes a pre-specified action. Possible pre-specified actions include having the network controller play an announcement to the caller explaining that the call cannot be completed, send a signal that makes the caller think the telephone is ringing even though it is not, transfer the caller to a voice mailbox, or transfer the caller to a pre-specified forwarding number.

In all of the above embodiments of telephone services using the system of the present invention, the local network controller can be configured to permit all calls from emergency services such as police, fire, and rescue to be completed and ring, regardless of the "at home" status of any transmitter 101, 102 of any household member, i.e., even if all household members are shown as not at home in the network's Who's_Home database 430. The purpose of this feature is to ensure the safety of household members and emergency services personnel. In the event of an automatic alarm on a monitored system, for example during a burglary, the safety of the police and the consumer is at stake. In such an instance, a call from the police to the household must be permitted to go through to ensure that the alarm is false before the police break down the home's door with weapons drawn.

In addition, the user upon installation or at any time thereafter may specify that certain telephone numbers always ring. The purpose of this override would be, for example, to permit emergency phone calls from a child's school always to be completed. These numbers could be contained in a network "AlwaysRing" database that is similar to the list of restricted outgoing or incoming telephone numbers contained in the databases 1201 and 1202 for the outbound and inbound versions of IfNotHome. As with the case of the Outbound and Inbound versions of the IfNotHome databases 1201 and 1202, the list of incoming telephone numbers in the network "Always Ring" database could be established by the subscriber by direct communication with the telephone company's customer service department (i.e., by telephone, e-mail, fax or other means) or could be uploaded from a list in the base station 300 set up by the user.

The present invention could also be used as an "intelligent" home controller to customize other, non-telephone, resources in the home according to who is home. In this embodiment, the base station 300 could be wired to the household's heating and cooling system thermostat via interface 312 in the base station. Using existing programmable thermostat technology, the thermostat could be programmed to set the household's temperature according to who is home. In this embodiment of the present invention, the record 420 for each household member in the base station database 306 would also include information regarding whether that household member has a need for special temperature settings. Household members requiring special thermostat settings may include, for example, an infant, an elderly person, or a household member who is ill.

Figure 15:
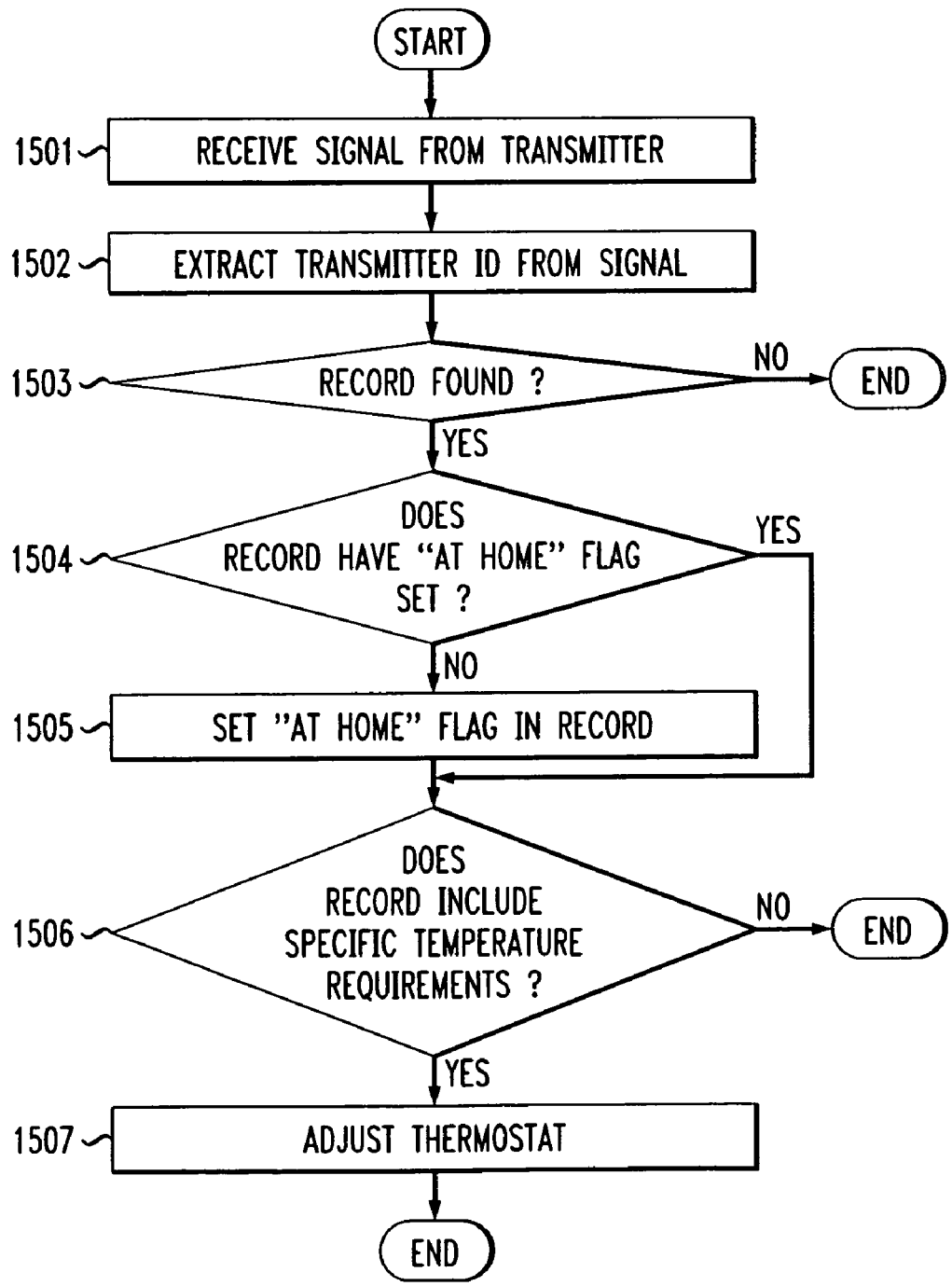
FIG. 15 is a flow chart depicting how the transmitter and the base station work together to adjust the home's thermostat when a household member arrives home.

FIG. 15 is a flow chart that shows how the transmitter and base station of the present invention could be used to set the home's temperature. As shown in FIG. 15, when the base station 300 receives a unique signal from a transmitter 101, 102 (step 1501), the base station processor 303 first extracts the transmitter's identification information from that unique signal at step 1502. At step 1503, the base station processor 303 checks the base station database 306 to see whether the received signal correlates to a record 420 found in the base station database 306. If so, the base station processor 303 takes step 1504 to check whether the record is set as "at home", and sets the record's "at home" flag at step 1505 if it is not already set. The base station processor 303 then takes decision step 1506 and checks the record 420 associated with that transmitter to see whether the record includes any specific temperature requirements, e.g., that the home is to be maintained especially warm or cool. If the answer at step 1506 is no, the base station processor 303 ends the processing for that signal. If the answer at step 1506 is yes, the base station processor 303 then adjusts the temperature accordingly via thermostat interface 312. It can easily be seen that the base station could also be programmed to automatically lower the home's temperature when the base station does not receive a signal from any transmitter for a predetermined period of time. In this manner, the present invention could lower the cost of heating and cooling the home.

Figure 16:
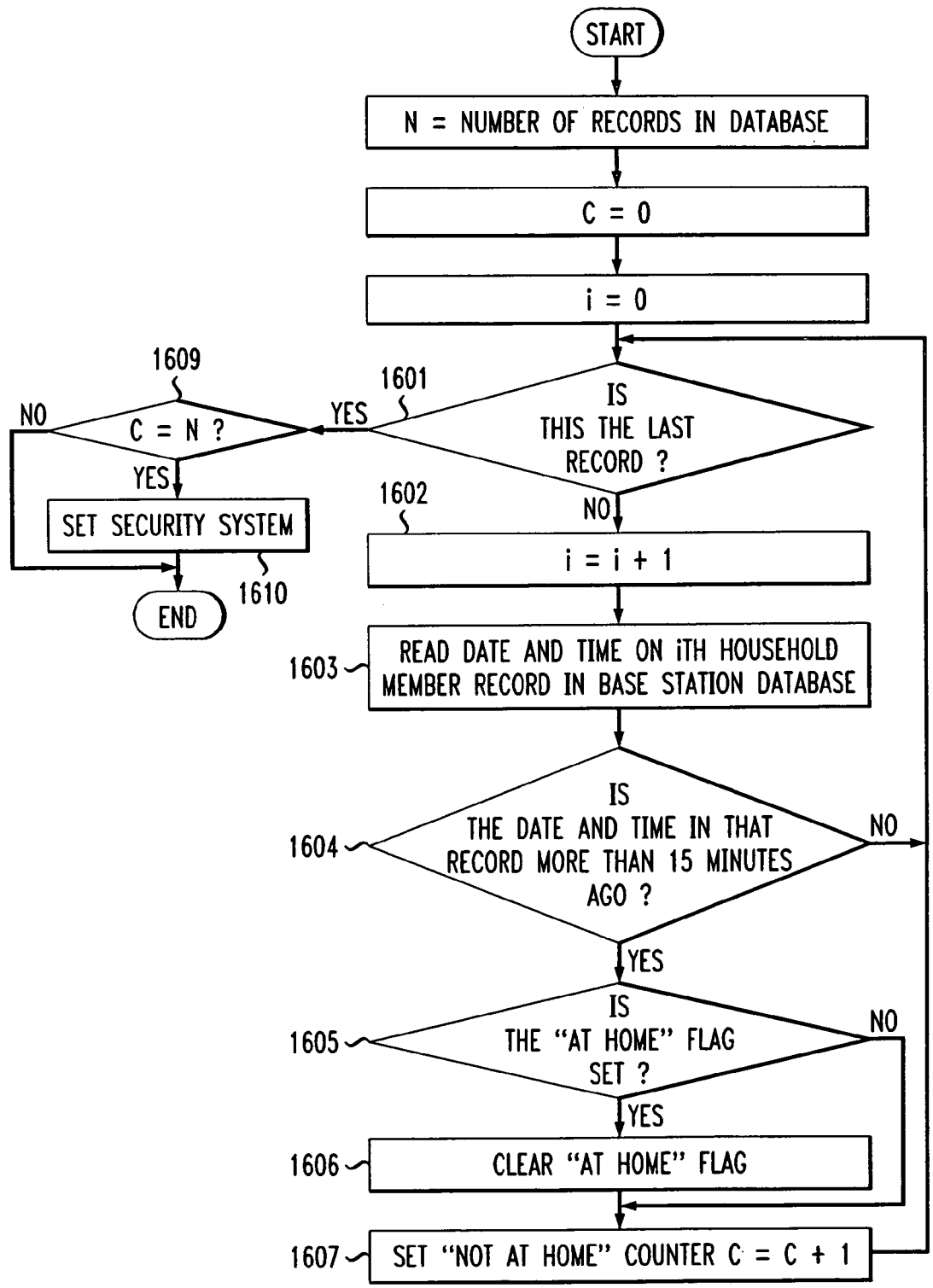
FIG. 16 is a flow chart depicting how the transmitter and the base station work together to control the home's security system when a household member leaves home.

Yet another use for the present invention is to use it to intelligently operate a home security system. In this embodiment of the invention, the home's security system would be connected to the base station 300 via security system interface 311, as shown in FIG. 3A. FIG. 16 is a flow chart depicting how the transmitter and base station of the present invention can be used to set the home's security system. As shown in FIG. 16, the base station processor 303 periodically reads the DATE and TIME information in each household member record 420 to determine whether all household members are at home.

To begin processing, the base station processor 303 starts with the total number of records 420 in the base station database 306, i.e., the total number of household members, equal to N, the processor's "not at home" counter C set at 0, and the number i of the record 420 to be checked set at 0. The base station processor 303 then proceeds to step 1601 to check whether the record 420 currently being checked is the last record 420 in the base station database 306, i.e., whether i=N. If the answer at step 1601 is no, the base station processor 303 proceeds to step 1602 and sets i=i+1 to read the next record 420 in the base station database 306.

The base station processor 303 then proceeds to step 1603 to read the DATE and TIME recorded in the record 420, and then to step 1604 to see whether the DATE and TIME in that record 420 is older than some predetermined length of time, for example, more than 15 minutes old. If the answer at step 1604 is no, the base station processor 303 returns to step 1601 and checks to see whether the record 420 just read is the last record 420 in the base station database 306. If the answer at step 1601 is no, the base station processor 303 goes to step 1602 and proceeds to check the next record 420 in the base station database 306 in the same manner.

If the answer at step 1604 is yes, i.e., the date and time on the record 420 is older than the predetermined time, the base station processor 303 proceeds to step 1605 to see whether the "at home" flag in the record 420 is set. If the answer at step 1605 is yes, the base station processor 303 clears the "at home" flag at step 1606 and goes to step 1607 and sets the processor's "not at home" counter C to C=C+1, i.e., the number of persons not at home has increased by one. The base station processor 303 then returns to step 1601 to check whether the record 420 just processed is the last record 420 in the base station database 306 and processes the next record 420 in the base station database 306 as described above.

If at any time, the answer at step 1601 is yes, i.e., the record 420 just processed is the last record 420 in the base station database 306, the base station processor 303 proceeds to step 1609 to check whether the "not at home" counter C is equal to the number of household members N, i.e., whether all the records 420 in the base station database 306 are flagged as "not at home." If the answer at step 1609 is no, the base station processor 303 ends processing the records 420 until it begins again after some predetermined time. If the answer at step 1609 is yes, i.e., the base station "not at home" counter C is equal to the total number of household members N, the base station processor 303 sets the home's security system via security system interface 311.

It can easily be seen how the present invention could work in a converse manner to turn off the home's security system when the base station detects a signal from a household member's transmitter, i.e., when a household member arrives home. In this manner, the present invention could automatically operate the home's security system when household members leave and arrive home, and household members would not have to remember a code, remember to activate the system when leaving home or rush to unlock and deactivate the system when returning.

The base station further could be wired into one or more lights in the home. In this way the present invention could be used to periodically turn those lights on and off when no one is at home, thereby enhancing security by giving the house a "lived-in" look.

Of course, each of these systems for heating and cooling, home security, and lighting could have a manual override so that they may be controlled by a household member independently of the "at home" status of any transmitter.

The invention also could have an automatic system to notify household members when to replace or recharge the batteries in their transmitters. As shown in FIG. 5, when the base station receives a transmission from a transmitter, in addition to extracting the transmitter's unique ID at step 502, it also extracts the battery strength status from the signal as well. The base station then checks whether the battery status is "weak" at step 506. If the answer at this step 506 is yes, the base station at step 510 sets the "battery" flag in the database record corresponding to that transmitter, and could then alert the household member in several ways. For example, the base station or the transmitter could have a red light that flashes to indicate a low battery as shown at step 511. Alternatively, upon detecting a signal indicating a weak battery, the base station could upload that information with the rest of the household database into the network database. The network could then place a telephone call to the household and play a message indicating that a transmitter's battery needs to be replaced or recharged.

While the present invention has been described with respect to particular embodiments, it should be apparent that other arrangements are possible within the spirit and scope of the present invention. For example, the transmitter could be designed to be carried by a household member in ways other than in the wallet or on a keychain, for example, as a medallion to be worn about the neck or as a device to be clipped to a belt. Though the invention has been described as being used in the home for household members, it easily could be adapted to use in a business or any other environment where it is desirable to tailor telephone or other services depending on who is physically present in that location. In addition, although three specialized telephone services are disclosed in the present application, the present invention could be used for any telephone or other service where it is desirable to tailor the service according to whether a particular person is present or whether any person is present or according to the number of persons present. Moreover, although the invention has been described as using a base station that is connected to the telephone network via wires, it is possible to use the present invention with a base station that uses wireless means to communicate with the telephone or other service network.

What is claimed is:

1. A method for managing telephone service for a plurality of persons sharing a common telephone line based on determining whether a person sharing the common telephone line is at the location served by the common telephone line and for restricting completion of a telephone call from the common telephone line to permit said telephone call to be completed only when a required person is present at the location served by the common telephone line, comprising the steps of periodically transmitting a unique signal from a transmitter adapted to accompany the person;

receiving said signal in a base station serving each person sharing the common telephone line at the location served by the common telephone line, the base station containing a processor, a receiver, and for each person sharing the common telephone line, a database record unique to the person;

the signal emitted by said transmitter having sufficient strength to be received by said base station receiver only when said transmitter is in close proximity to said receiver;

processing said unique signal within the base station;

correlating said unique signal to the unique record maintained for each person in the base station database;

recording a receipt of said signal in said base station database record;

recording a failure to receive said signal in said base station database record;

whereby the base station database maintains a record for each person sharing the common telephone line indicating whether that person is or is not at the location served by the common telephone line;

upon detecting a change in at least one of said records in said base station database, initiating a wire line telephone call over the common telephone line to a local telephone network controller located in the telephone network providing telephone service to the common telephone line;

uploading said changed records in the base station database via the wire line telephone call into a network database maintained by the local telephone network controller, thereby to record in the network database whether each of the persons sharing the common telephone line is or is not at the location served by the common telephone line;

after uploading said base station database, disconnecting said telephone call to the local telephone network controller;

maintaining in the network database records a database of subscriber numbers including the subscriber number associated with the common telephone line and at least one subscriber telephone numbers including the subscriber number associated with the common telephone line that have restrictions on outbound telephone calls;

maintaining, in the network database records, for each of said subscriber telephone numbers that have restrictions on outbound telephone calls, a list of at least one restricted outbound telephone numbers;

maintaining within the base station database records a list of at least one restricted outbound telephone numbers associated with at least one of the persons sharing the common telephone line;

upon detecting a change in at least one of the records in said base database list of restricted outbound telephone numbers, initiating a wire line telephone call over the common telephone line to the local telephone network controller;

uploading said changed restricted outbound telephone number list records in the base station database via the wire line telephone call into the network database records, thereby to record in the network database an updated list of restricted outbound telephone numbers associated with persons sharing the common telephone line;

after uploading said base station database, disconnecting said telephone call to the local telephone network controller;

receiving an outbound telephone call from the subscriber number of the common telephone line;

checking the network database to determine whether said outbound telephone call is from one of said subscriber telephone numbers that has restrictions on outbound telephone calls;

checking the updated network database list of restricted outbound telephone numbers to determine whether a number being called may be completed only if at least one required person is present;

checking the updated network database to determine whether said at least one required person is present at the location served by the common telephone line; and permitting said outbound telephone call to be completed only if said at least one required person is present at the location served by the common telephone line.

2. The method according to claim 1, further comprising the step of updating the network database list of restricted outbound telephone numbers by submitting a message by telephone, email or mail to a customer service department within the local telephone network provider.

3. A method for managing telephone service for a plurality of persons sharing a common telephone line based on determining whether a person sharing the common telephone line is as the location served by the common telephone line and for restricting completion of a telephone call to the common telephone line to permit said telephone call to be completed only when a required person is present at the location served by the common telephone line, comprising the steps of:

periodically transmitting a unique signal from a transmitter adapted to accompany the person;

receiving said signal in a base station serving each person sharing the common telephone line at the location served by the common telephone line, the base station containing a processor, a receiver, and for each person sharing the common telephone line, a database record unique to the person;

the signal emitted by said transmitter having sufficient strength to be received by said base station receiver only when said transmitter is in close proximity to said receiver;

processing said unique signal within the base station;

correlating said unique signal to the unique record maintained for each person in the base station database;

recording a receipt of said signal in said base station database record;

recording a failure to receive said signal in said base station database record;

whereby the base station database maintains a record for each person sharing the common telephone line indicating whether that person is or is not at the location served by the common telephone line;

upon detecting a change in at least one of said records in said base station database, initiating a wire line telephone call over the common telephone line to a local telephone network controller located in the telephone network providing telephone service to the common telephone line;

uploading said changed records in the base station database via the wire line telephone call into a network database maintained by the local telephone network controller, thereby to record in the network database whether each of the persons sharing the common telephone line is or is not at the location served by the common telephone line;

after uploading said base station database, disconnecting said telephone call to the local telephone network controller;

maintaining in the network database records a database of subscriber numbers including the subscriber number associated with the common telephone line and at least one subscriber telephone numbers including the subscriber number associated with the common telephone line that have restrictions on inbound telephone calls;

maintaining in the network database records, for each of said subscriber telephone numbers that have restrictions on inbound telephone calls, a list of at least one restricted inbound telephone numbers;

maintaining within the base station database records a list of at least one restricted inbound telephone numbers associated with at least one of the persons sharing the common telephone line;

upon detecting a change in at least one of the records in said base database list of restricted inbound telephone numbers, initiating a wire line telephone call over the common telephone line to the local telephone network controller;

uploading said changed restricted inbound telephone number list records in the base station database via the wire line telephone call into the network database records, thereby to record in the network database an updated list of restricted inbound telephone numbers associated with persons sharing the common telephone line;

after uploading said base station database disconnecting said telephone call to the local telephone network controller;

receiving an inbound telephone call to the subscriber number of the common telephone line;

checking the network database to determine whether said inbound telephone call is to a subscriber telephone number that has restrictions on inbound telephone calls;

checking the updated network database list of restricted inbound telephone numbers to determine whether said inbound telephone call to said subscriber telephone number being called may be completed only if at least one required person is present;

checking the updated network database to determine whether said at least one required person is present at the location served by the common telephone line;

permitting said inbound telephone call to be completed only if said at least one required person is present at the location served by the common telephone line; and providing another service to the caller if said at least one required person is not present at the location served by the common telephone line.

4. The method according to claim 3, further comprising the step of updating the network database list of restricted inbound telephone numbers by submitting a message by telephone email or mail to a customer service department within the local telephone network provider.

* * * * *